US010067588B2

(12) United States Patent
Tan et al.

(10) Patent No.: US 10,067,588 B2
(45) Date of Patent: Sep. 4, 2018

(54) TOUCH SCANNING CIRCUIT AND DRIVING METHOD THEREOF, TOUCH DRIVING CIRCUIT AND TOUCH PANEL

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Wen Tan, Beijing (CN); Yin Deng, Beijing (CN); Dongmei Wei, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 44 days.

(21) Appl. No.: 15/537,769

(22) PCT Filed: Nov. 25, 2016

(86) PCT No.: PCT/CN2016/107315
§ 371 (c)(1),
(2) Date: Jun. 19, 2017

(87) PCT Pub. No.: WO2017/121196
PCT Pub. Date: Jul. 20, 2017

(65) Prior Publication Data
US 2018/0059836 A1 Mar. 1, 2018

(30) Foreign Application Priority Data
Jan. 12, 2016 (CN) .......................... 2016 1 0018412

(51) Int. Cl.
G06F 3/044 (2006.01)
G06F 3/041 (2006.01)

(52) U.S. Cl.
CPC ............ *G06F 3/0412* (2013.01); *G06F 3/044* (2013.01); *G06F 3/0416* (2013.01); *G06F 2203/04112* (2013.01); *G09G 2310/0264* (2013.01)

(58) Field of Classification Search
None
See application file for complete search history.

(56) References Cited

U.S. PATENT DOCUMENTS 9,229,590 B2 * 1/2016 Kim ................. G06F 3/0412
2006/0291610 A1 * 12/2006 Lo .................... G11C 19/28
377/64

(Continued)

FOREIGN PATENT DOCUMENTS

CN 104393874 A 3/2015
CN 104808862 A 7/2015
CN 105677109 A 6/2016

OTHER PUBLICATIONS

International Search Report and Written Opinion dated Mar. 2, 2017; PCT/CN2016/107315.

*Primary Examiner* — William Lu
(74) *Attorney, Agent, or Firm* — Ladas & Parry LLP

(57) ABSTRACT

A touch scanning circuit and a driving method thereof, a touch driving circuit and a display panel. The touch scanning circuit includes: an input sub-circuit, a first control sub-circuit, a second control sub-circuit, a shift output sub-circuit and a touch output sub-circuit. The input sub-circuit is configured to control a potential of a first node; the first control sub-circuit is configured to control connection and disconnection between the first node and a third node; the second control sub-circuit is configured to control a potential (Continued)

of a second node; the shift output sub-circuit is configured to control a potential of a shift output end according to the third node and the second node; and the touch output sub-circuit is configured to control a signal outputted from a touch output end according to the second node, the shift output end and the first clock signal end.

20 Claims, 12 Drawing Sheets

(56) References Cited

U.S. PATENT DOCUMENTS

| | | | |
|---|---|---|---|
| 2010/0007632 A1* | 1/2010 | Yamazaki | G06F 1/1616 345/175 |
| 2011/0148846 A1* | 6/2011 | Arasawa | G09G 3/3614 345/212 |
| 2011/0175895 A1* | 7/2011 | Hayakawa | G09G 3/3655 345/212 |
| 2011/0267326 A1* | 11/2011 | Kim | G09G 3/3677 345/211 |
| 2012/0105338 A1* | 5/2012 | Lin | G06F 3/0416 345/173 |
| 2013/0321248 A1* | 12/2013 | Kimura | H01L 33/0041 345/76 |
| 2014/0023173 A1* | 1/2014 | Miyake | G11C 19/188 377/54 |
| 2016/0300523 A1* | 10/2016 | Tan | G06F 3/0412 |
| 2016/0365061 A1* | 12/2016 | Hong | G06F 3/041 |
| 2017/0076683 A1* | 3/2017 | Lee | G11C 19/28 |
| 2017/0092172 A1* | 3/2017 | Wang | G09G 3/20 |
| 2017/0123556 A1* | 5/2017 | Lin | G06F 3/0412 |
| 2017/0125122 A1* | 5/2017 | Miyake | G11C 19/28 |
| 2017/0186352 A1* | 6/2017 | Lin | G09G 3/20 |
| 2017/0269769 A1* | 9/2017 | Hu | G06F 3/0416 |

* cited by examiner

TOUCH SCANNING CIRCUIT AND DRIVING METHOD THEREOF, TOUCH DRIVING CIRCUIT AND TOUCH PANEL

TECHNICAL FIELD

Embodiments of the present disclosure relate to the technical field of touch control technologies, in particular to a touch scanning circuit, a driving method thereof, a touch driving circuit and a touch panel.

BACKGROUND

With rapid development of the display technology, touch screen panels have been gradually and widely applied in people's lives. Currently, according to the structures, the touch screen panels may be divided into: add-on touch panels, on-cell touch panels and in-cell touch panels. For example, an add-on touch panel is manufactured by separately producing a touch screen and a display which are then bonded together to form a display device with a touch function. The add-on touch panel has defects such as a high production cost, a low light transmittance, thick modules, etc. An in-cell touch panel is to embed touch electrodes of a touch screen into a display, which not only can reduce an overall thickness of modules but also can greatly reduce a production cost of the touch panel. The in-cell touch panel is favored by various panel manufacturers. In the technology of the in-cell touch panel, mutual-capacitive touch panels have become a mainstream in the technical development of the current in-cell touch panels due to advantages such as high sensitivity and multi-point touch.

More specifically, an in-cell touch panel is a device in which touch scanning lines and touch sensing lines in a touch screen are integrated into a display screen. For instance, the touch scanning lines and the touch sensing lines are integrated into a liquid crystal display (LCD) or an organic light-emitting diode (OLED) display. In a traditional design, as shown in FIG. 1, touch scanning signals on touch scanning lines Txn (n=1, 2, 3 . . . ) are transmitted by an external driver (integrated circuit (IC)) through wirings disposed at a border area. However, with an increased size of the display device, the number of the touch scanning lines Txn is increased, so that the number of the wirings for transmitting the touch scanning signals to the touch scanning lines Txn is also correspondingly increased. Thus, a space occupied by the wirings can be increased, and hence the application of the in-cell technology in large-size and narrow-bezel display devices can be limited.

In order to solve the above problems, a touch driving circuit for outputting touch scanning signals to touch scanning lines is generally integrated on an array substrate currently, so that the wirings at the border area can be saved, and hence the narrow-bezel design of large-size displays can be achieved. Therefore, a touch driving circuit integrated on an array substrate has become a technical problem that is needed to be solved in the field.

SUMMARY

In view of this, embodiments of the present disclosure provide a touch scanning circuit, a driving method thereof, a touch driving circuit and a touch panel. A touch driving circuit with a simple structure and being integrated on an array substrate is implemented.

Embodiments of the disclosure provide a touch scanning circuit, comprising: an input sub-circuit, a first control sub-circuit, a second control sub-circuit, a shift output sub-circuit and a touch output sub-circuit, where:

a first end of the input sub-circuit is connected with a shift input signal end, a second end is connected with a first reference signal end, a third end is connected with a second reference signal end, a fourth end is connected with a first node, and a fifth end is connected with a second node; the input sub-circuit is configured to provide a signal of the first reference signal end to the first node under control of the shift input signal end, and provide a signal of the second reference signal end to the first node under control of the second node;

a first end of the first control sub-circuit is connected with the first node, a second end is connected with a first clock signal end, a third end is connected with a third node, and a fourth end is connected with a shift output end; the first control sub-circuit is configured to allow the first node and the third node to be in a connecting state under control of the first clock signal end, and allow a voltage difference between the first node and the shift output end to be kept stable when the first node is in a floating state;

a first end of the second control sub-circuit is connected with the second node, a second end is connected with the shift input signal end, a third end is connected with the first clock signal end, and a fourth end is connected with the second reference signal end; the second control sub-circuit is configured to provide the signal of the second reference signal end to the second node under control of the shift input signal end, and provide a signal of the first clock signal end to the second node under control of the first clock signal end;

a first end of the shift output sub-circuit is connected with the third node, a second end is connected with a second clock signal end, a third end is connected with the second node, a fourth end is connected with the second reference signal end, and a fifth end is connected with the shift output end; the shift output sub-circuit is configured to allow a voltage difference between the third node and the shift output end to be kept stable when the third node is in the floating state, provide a signal of the second clock signal end to the shift output end under control of the third node, and provide the signal of the second reference signal end to the shift output end under control of the second node;

a first end of the touch output sub-circuit is connected with the shift output end, a second end is connected with a touch input signal end, a third end is connected with the second node, a fourth end is connected with a common signal end, a fifth end is connected with the first clock signal end, and a sixth end is connected with a touch output end; and the touch output sub-circuit is configured to provide a signal of the touch input signal end to the touch output end under control of the shift output end, and provide a signal of the common signal end to the touch output end under control of at least one of the second node or the first clock signal end.

In an example implementation, in the above touch scanning circuit provided by the embodiments of the disclosure, the first control sub-circuit includes: a first switching transistor and a first capacitor, in which: a gate electrode of the first switching transistor is connected with the first clock signal end, a source electrode is connected with the first node, and a drain electrode is connected with the third node; and the first capacitor is connected between the first node and the shift output end.

In an example implementation, in the above touch scanning circuit provided by the embodiments of the disclosure, the input sub-circuit includes: a second switching transistor and a third switching transistor, in which: a gate electrode of the second switching transistor is connected with the shift input signal end, a source electrode is connected with the first reference signal end, and a drain electrode is connected with the first node; and a gate electrode of the third switching transistor is connected with the second node, a source electrode is connected with the second reference signal end, and a drain electrode is connected with the first node.

In an example implementation, in the above touch scanning circuit provided by the embodiments of the disclosure, the shift output sub-circuit includes: a fourth switching transistor, a fifth switching transistor and a second capacitor, in which: a gate electrode of the fourth switching transistor is connected with the third node, a source electrode is connected with the second clock signal end, and a drain electrode is connected with the shift output end; a gate electrode of the fifth switching transistor is connected with the second node, a source electrode is connected with the second reference signal end, and a drain electrode is connected with the shift output end; and the second capacitor is connected between the third node and the shift output end.

In an example implementation, in the above touch scanning circuit provided by the embodiments of the disclosure, the touch output sub-circuit includes: a sixth switching transistor, a seventh switching transistor and an eighth switching transistor, in which: a gate electrode of the sixth switching transistor is connected with the shift output end, a source electrode is connected with the touch input signal end, and a drain electrode is connected with the touch output end; a gate electrode of the seventh switching transistor is connected with the second node, a source electrode is connected with the common signal end, and a drain electrode is connected with the touch output end; and a gate electrode of the eighth switching transistor is connected with the first clock signal end, a source electrode is connected with the common signal end, and a drain electrode is connected with the touch output end.

In an example implementation, in the above touch scanning circuit provided by the embodiments of the disclosure, the second control sub-circuit includes: a ninth switching transistor and a tenth switching transistor, in which: a gate electrode of the ninth switching transistor is connected with the shift input signal end, a source electrode is connected with the second reference signal end, and a drain electrode is connected with the second node; and both a gate electrode and a source electrode of the tenth switching transistor are connected with the first clock signal end, and a drain electrode is connected with the second node.

In an example implementation, in the above touch scanning circuit provided by the embodiments of the disclosure, the second control sub-circuit includes: an eleventh switching transistor and a third capacitor, in which: a gate electrode of the eleventh switching transistor is connected with the shift input signal end, a source electrode is connected with the second reference signal end, and a drain electrode is connected with the second node; and the third capacitor is connected between the second node and the first clock signal end.

In an example implementation, in the above touch scanning circuit provided by the embodiments of the disclosure, the second control sub-circuit includes: a twelfth switching transistor, a thirteenth switching transistor, a fourteenth switching transistor and a fifteenth switching transistor, in which: a gate electrode of the twelfth switching transistor is connected with the shift input signal end, a source electrode is connected with the second reference signal end, and a drain electrode is connected with a gate electrode of the fifteenth switching transistor; a gate electrode of the thirteenth switching transistor is connected with the shift input signal end, a source electrode is connected with the second reference signal end, and a drain electrode is connected with the second node; both a gate electrode and a source electrode of the fourteenth switching transistor are connected with the first clock signal end, and a drain electrode is connected with the gate electrode of the fifteenth switching transistor; and a source electrode of the fifteenth switching transistor is connected with the first clock signal end, and a drain electrode is connected with the second node.

Correspondingly, a touch driving circuit provided by embodiments of the disclosure includes a plurality of touch scanning circuits described in above in a cascade connection, where:

except a final-stage touch scanning circuit, a shift output end in each of the remaining touch scanning circuits is respectively connected with a shift input signal end in a next-stage touch scanning circuit that is adjacent to the corresponding touch scanning circuit, and a shift input signal end in a first-stage touch scanning circuit is connected with a frame start signal end.

Correspondingly, a touch panel provided by embodiments of the disclosure includes a plurality of touch scanning lines disposed on an array substrate in the touch panel, and a touch driving circuit disposed at a border of the array substrate and configured to sequentially output touch scanning signals to the touch scanning lines, wherein the touch driving circuit is the touch driving circuit described above.

Correspondingly, a driving method of the touch scanning circuit described above provided by embodiments of the disclosure includes: an input period, an output period and a first maintaining period, in which:

at the input period, the input sub-circuit provides the signal of the first reference signal end to the first node under the control of the shift input signal end; the second control sub-circuit provides the signal of the second reference signal end to the second node under the control of the shift input signal end; the first control sub-circuit allows the first node and the third node to be in the connecting state under the control of the first clock signal end; the shift output sub-circuit provides the signal of the second clock signal end to the shift output end under the control of the third node; the touch output sub-circuit provides the signal of the common signal end to the touch output end under the control of the first clock signal end;

at the output period, the first node and the third node are in the floating state; the first control sub-circuit allows the voltage difference between the first node and the shift output end to be kept stable; the shift output sub-circuit allows the voltage difference between the third node and the shift output end to be kept stable, and provides the signal of the second clock signal end to the shift output end under the control of the third node; the touch output sub-circuit provides the signal of the touch input signal end to the touch output end under the control of the shift output end;

at the first maintaining period, the second control sub-circuit provides the signal of the first clock signal end to the second node under the control of the first clock signal end; the input sub-circuit provides the signal of the second reference signal end to the first node under the control of the second node; the first control sub-circuit allows the first node and the third node to be in the connecting state under the control of the first clock signal end; the shift output sub-circuit provides the signal of the second reference signal end to the shift output end under the control of the second node; and the touch output sub-circuit provides the signal of the common signal end to the touch output end under the control of the second node and the first clock signal end.

The touch scanning circuit, the driving method thereof, the touch driving circuit and the touch panel, provided by the embodiments of the present disclosure, comprise: an input sub-circuit, a first control sub-circuit, a second control sub-circuit, a shift output sub-circuit and a touch output sub-circuit, where the input sub-circuit is configured to control the potential of a first node, the first control sub-circuit is configured to control the connection and disconnection between the first node and a third node, the second control sub-circuit is configured to control the potential of a second node, the shift output sub-circuit is configured to control the potential of a shift output end according to the third node and the second node, and the touch output sub-circuit is configured to control a signal outputted by a touch output end according to the second node, the touch output end and a first clock signal end. The touch scanning circuit with a simple structure is realized by the cooperation of the above five sub-circuits. Moreover, as the first control sub-circuit may control the connection and disconnection between the first node and the third node, the influence of instable potential of the first node on the potential of the third node can be avoided, and hence the output stability of the touch-scanning circuit can be guaranteed.

DETAILED DESCRIPTION

Detailed description will be given below to implementations of the touch scanning circuit, the driving method thereof, the touch driving circuit and the touch panel provided by embodiments the present disclosure with reference to the accompanying drawings.

Figure 1:
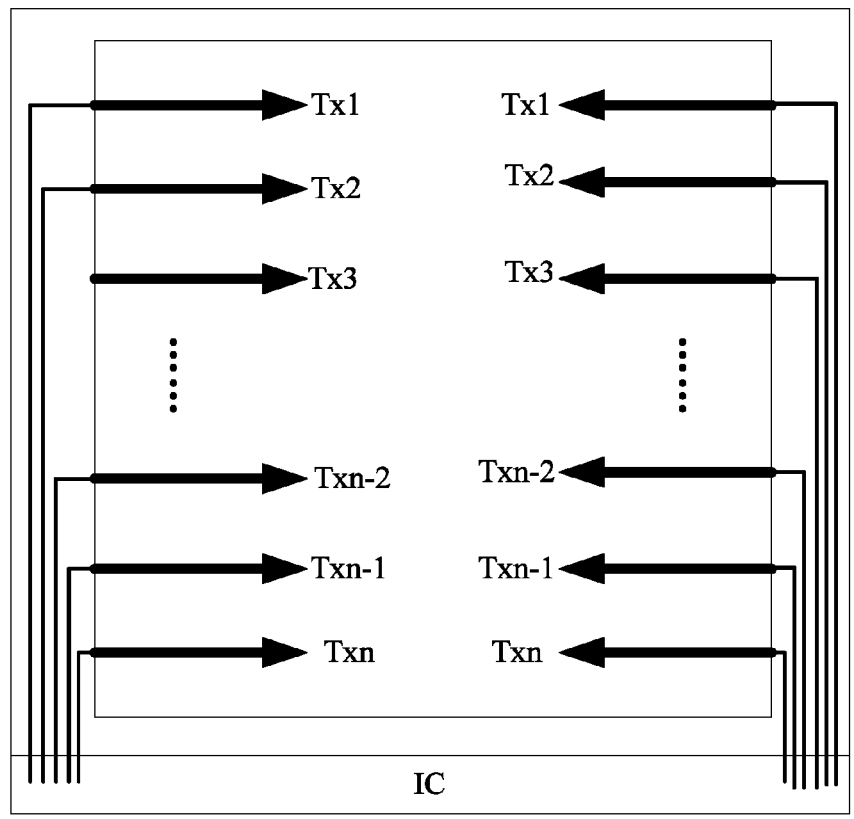
FIG. 1 is a schematic structural view of an existing touch panel.
Figure 2:
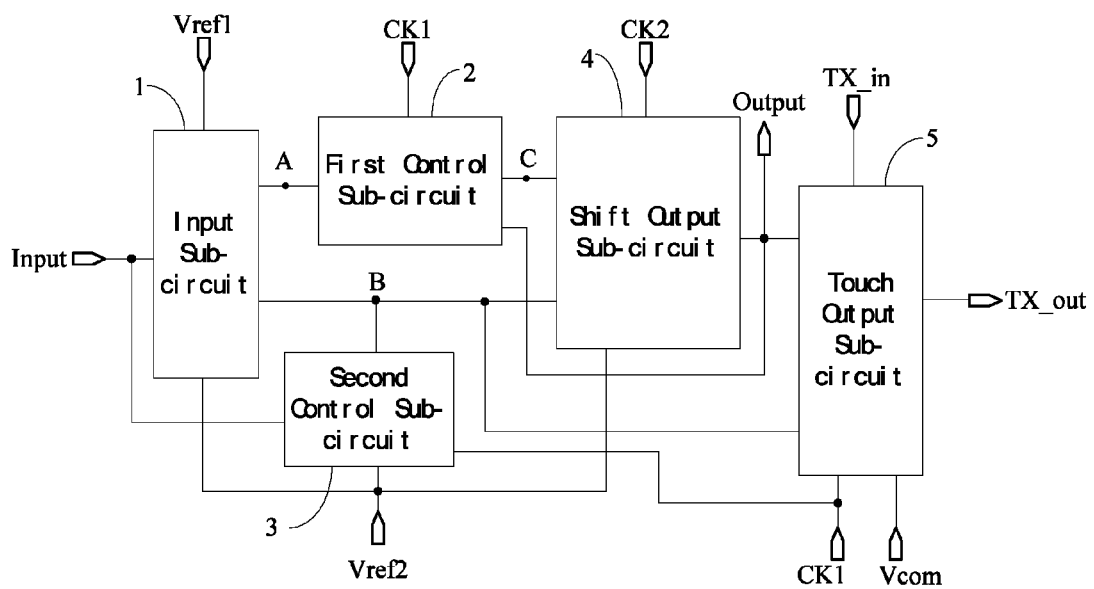
FIG. 2 is a schematic structural view of a touch scanning circuit provided by an embodiment of the present disclosure.

An embodiment of the present disclosure provides a touch scanning circuit, which, as shown in FIG. 2, comprises: an input sub-circuit 1, a first control sub-circuit 2, a second control sub-circuit 3, a shift output sub-circuit 4 and a touch output sub-circuit 5.

A first end of the input sub-circuit 1 is connected with a shift input signal end Input; a second end is connected with a first reference signal end Vref1; a third end is connected with a second reference signal end Vref2; a fourth end is connected with a first node A; and a fifth end is connected with a second node B. The input sub-circuit 1 is configured to provide a signal of the first reference signal end Vref1 to the first node A under the control of the shift input signal end Input, and provide a signal of the second reference signal end Vref2 to the first node A under the control of the second node B.

A first end of the first control sub-circuit 2 is connected with the first node A; a second end is connected with a first clock signal end CK1; a third end is connected with a third node C; and a fourth end is connected with a shift output end Output. The first control sub-circuit 3 is configured to connect the first node A with the third node C under the control of the first clock signal end CK1, and allow a voltage difference between the first node A and the shift output end Output to be kept stable when the first node A is in a floating state.

A first end of the second control sub-circuit 3 is connected with the second node B; a second end is connected with the shift input signal end Input; a third end is connected with the first clock signal end CK1; and a fourth end is connected with the second reference signal end Vref2. The second control sub-circuit 3 is configured to provide the signal of the second reference signal end Vref2 to the second node B under the control of the shift input signal end Input, and provide a signal of the first clock signal end CK1 to the second node B under the control of the first clock signal end CK1.

A first end of the shift output sub-circuit 4 is connected with the third node C; a second end is connected with a second clock signal end CK2; a third end is connected with the second node B; a fourth end is connected with the second reference signal end Vref2; and a fifth end is connected with the shift output end Output. The shift output sub-circuit 4 is configured to allow the voltage difference between the third node C and the shift output end Output to be kept stable when the third node C is in the floating state, provide a signal of the second clock signal end CK2 to the shift output end Output under the control of the third node C, and provide the signal of the second reference signal end Vref2 to the shift output end Output under the control of the second node B.

A first end of the touch output sub-circuit 5 is connected with the shift output end Output; a second end is connected with a touch input signal end TX_in; a third end is connected with the second node B; a fourth end is connected with a common signal end Vcom; a fifth end is connected with the first clock signal end CK1; and a sixth end is connected with a touch output end TX_out. The touch output sub-circuit 5 is configured to provide a signal of the touch input signal end TX_in to the touch output end TX_out under the control of the shift output end Output, and provide a signal of the common signal end Vcom to the touch output end TX_out under the control of the second node B or the first clock signal end CK1.

The touch scanning circuit provided by the embodiments of the present disclosure comprises: an input sub-circuit, a first control sub-circuit, a second control sub-circuit, a shift output sub-circuit and a touch output sub-circuit, wherein the input sub-circuit is configured to control the potential of a first node, the first control sub-circuit is configured to control the connection and disconnection between the first node and a third node, the second control sub-circuit is configured to control the potential of a second node; the shift output sub-circuit is configured to control the potential of a shift output end according to the third node and the second node, and the touch output sub-circuit is configured to control a signal outputted by the touch output end according to the second node, the touch output end and a first clock signal end. The touch scanning circuit with a simple structure is achieved by the cooperation of the above five sub-circuits. Moreover, as the first control sub-circuit can control the connection and disconnection between the first node and the third node, the influence of instable potential of the first node on the potential of the third node can be avoided, and hence the output stability of the touch scanning circuit can be guaranteed.

It should be noted that: in the touch scanning circuit provided by the embodiments of the present disclosure, when an effective pulse signal at the shift input signal end is a high level signal, the potential of the first reference signal end is a high level and the potential of the second reference signal end is a low level; and when the effective pulse signal at the shift input signal end is a low level signal, the potential of the first reference signal end is a low level and the potential of the second reference signal end is a high level.

Moreover, in the shift touch scanning circuit provided by the embodiments of the present disclosure, a phase of a first clock signal at the first clock signal end is opposite to a phase of a second clock signal at the second clock signal end.

Detailed description will be given below to the present disclosure with reference to the example embodiments. It should be noted that the embodiments are used for more clear description of the present disclosure and not intended to limit the present disclosure.

For example, in the touch scanning circuit provided by an embodiment of the present disclosure, as shown in FIGS. 3a to 4c, the first control sub-circuit 2 may include: a first switching transistor T1 and a first capacitor C1.

A gate electrode of the first switching transistor T1 is connected with the first clock signal end CK1; a source electrode is connected with the first node A; and a drain electrode is connected with the third node C. The first capacitor C1 is connected between the first node A and the shift output end Output.

In this case, when the first clock signal end CK1 controls the first switching transistor T1 to be in a switching-on state, the conducted first switching transistor T1 allows the first node A to be conducted with the third node C. Thus, by utilization of the first switching transistor T1 to control the connection and disconnection between the first node A and the third node C, the potential of the third node C is not affected by the potential of the first node A when the first switching transistor T1 is in the switching-off state. When the first switching transistor T1 is in the switching-off state, the first node A is in a floating state, and the voltage difference between the first node A and the shift output end Output is kept stable due to the bootstrap function of the first capacitor C1, so that the potential of the first node A can be guaranteed to be kept stable.

Figure 3A:
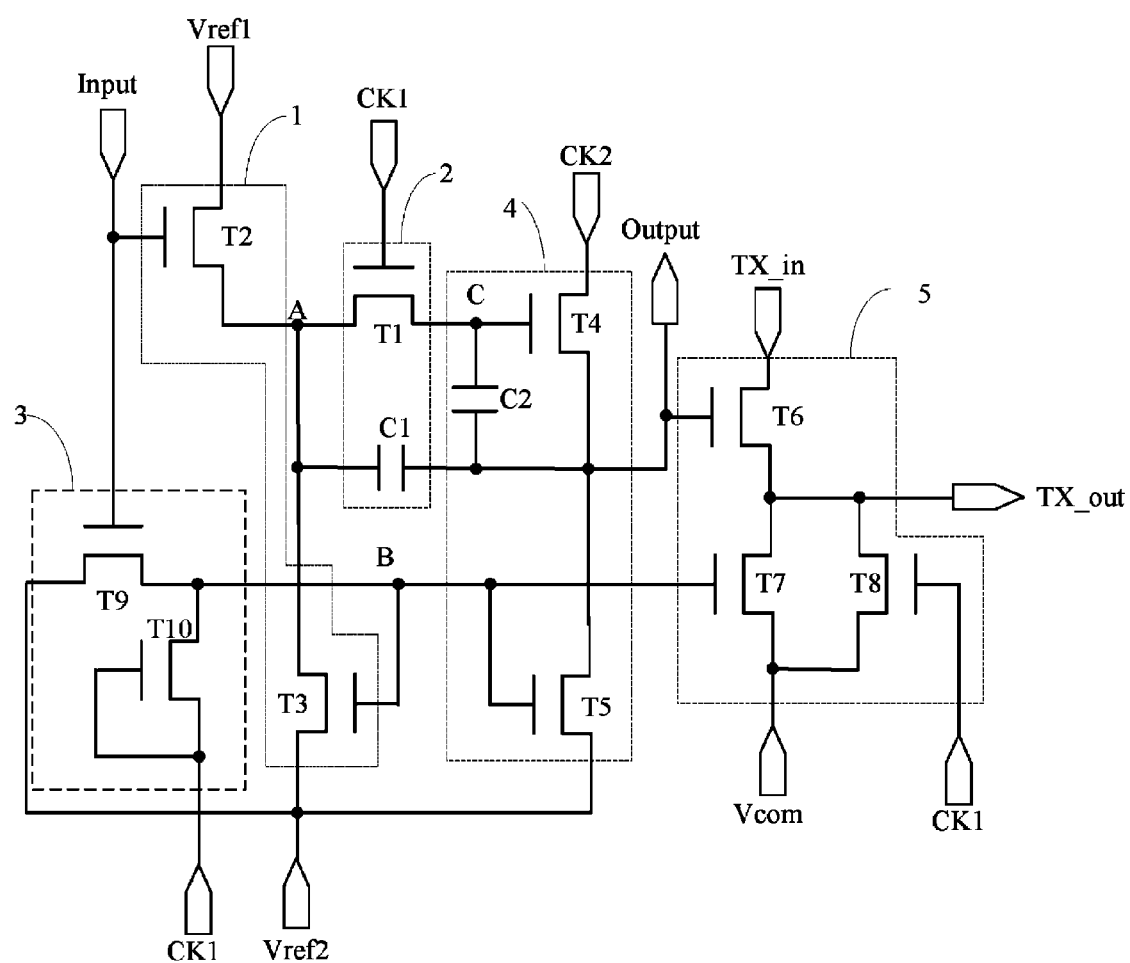
FIGS. 3a to 3c are respectively specific schematic structural views of a touch scanning circuit comprising N-type transistors provided by embodiments of the present disclosure.
Figure 3B:
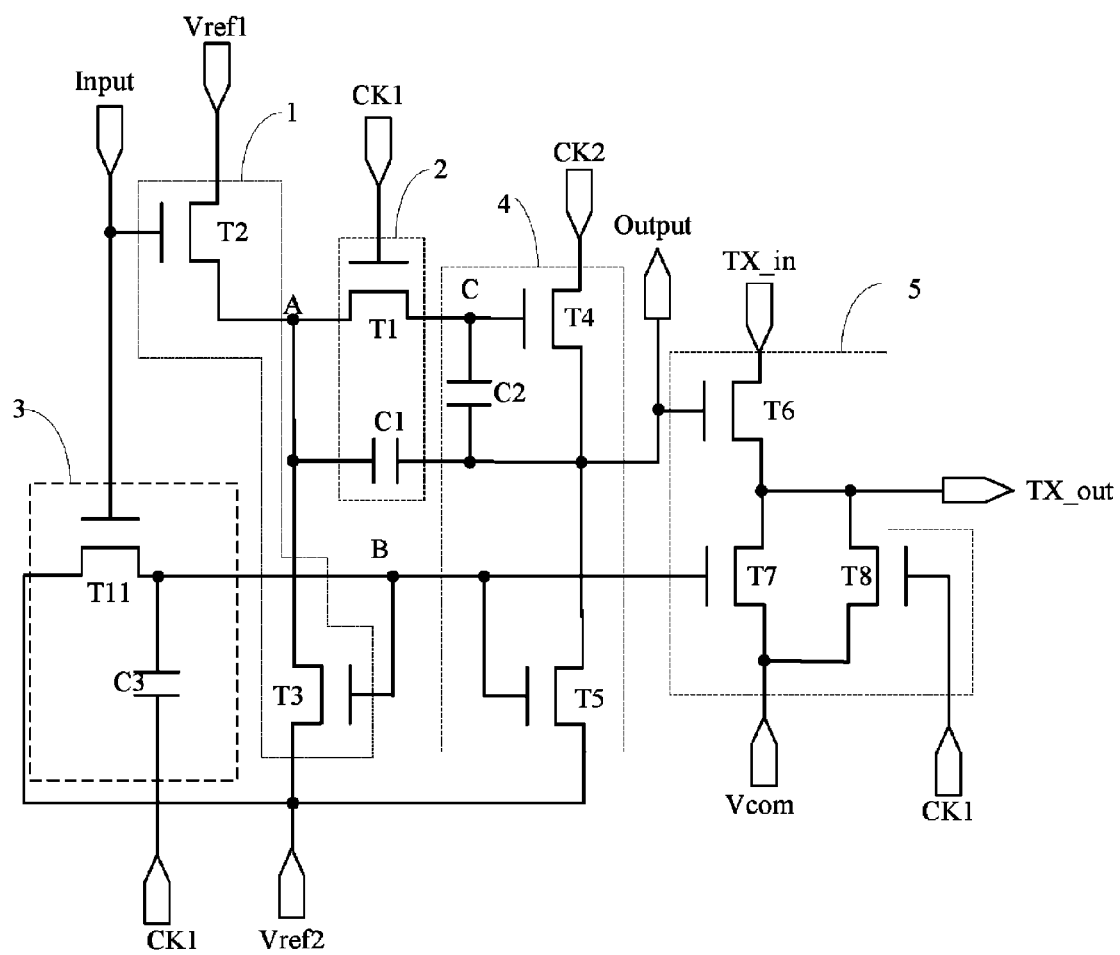
Figure 3C:
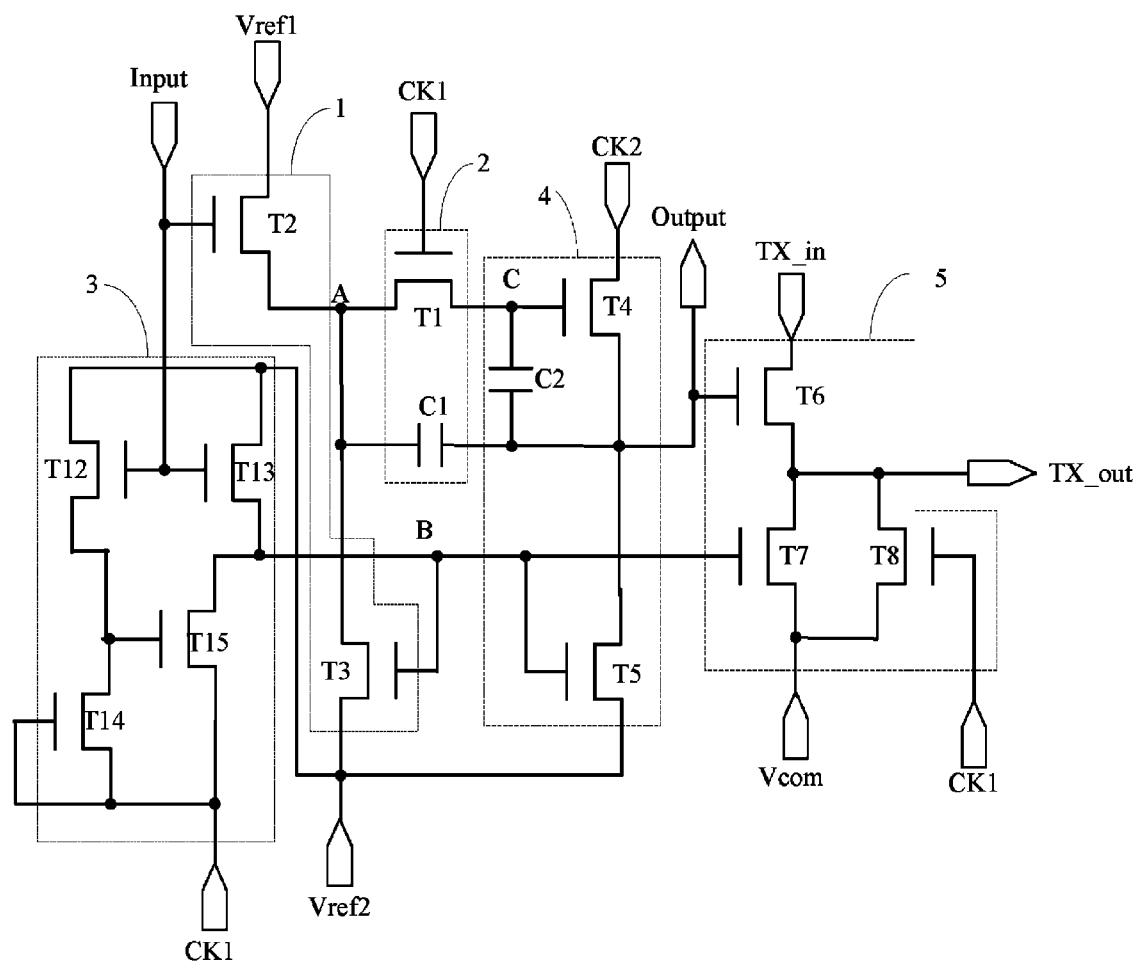
Figure 4A:
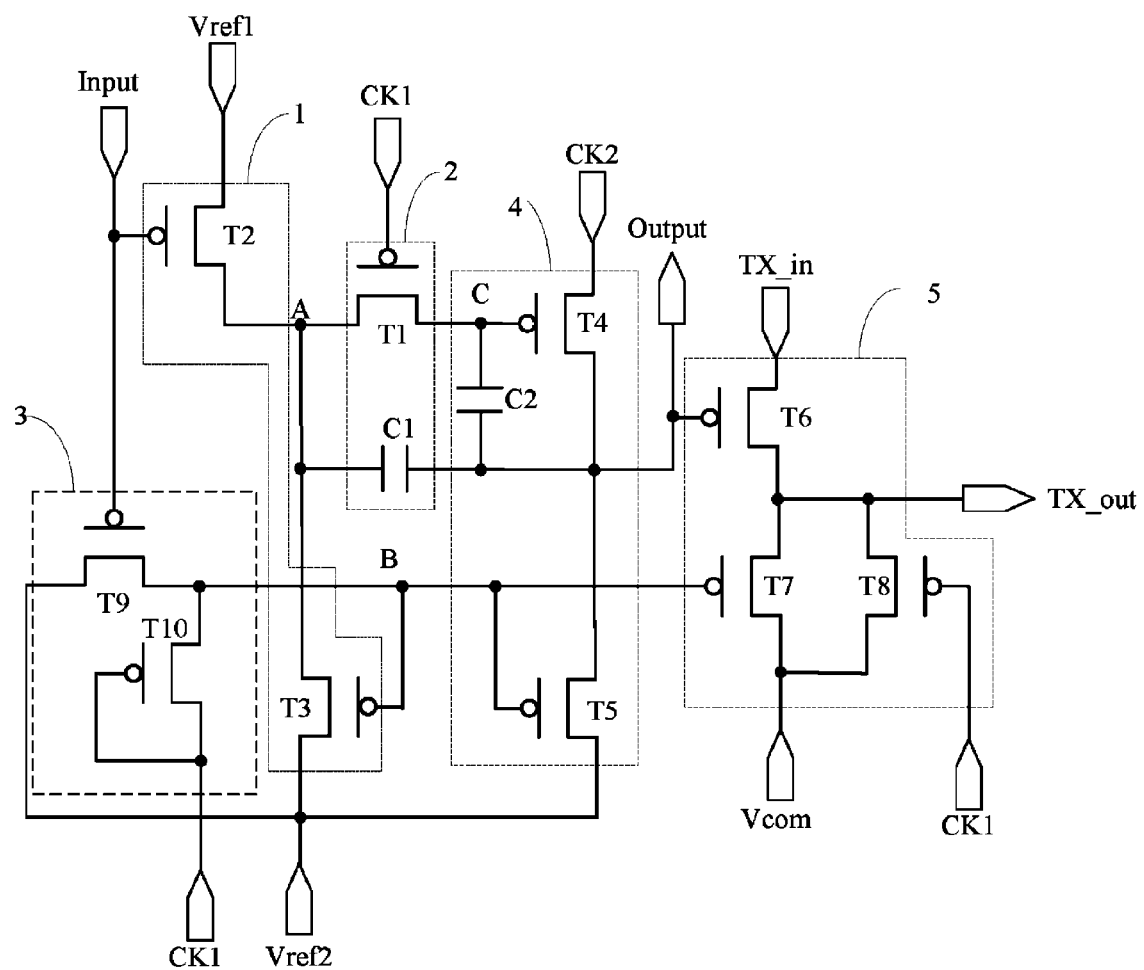
FIGS. 4a to 4c are respectively specific schematic structural views of a touch scanning circuit comprising P-type transistors provided by embodiments of the present disclosure.
Figure 4B:
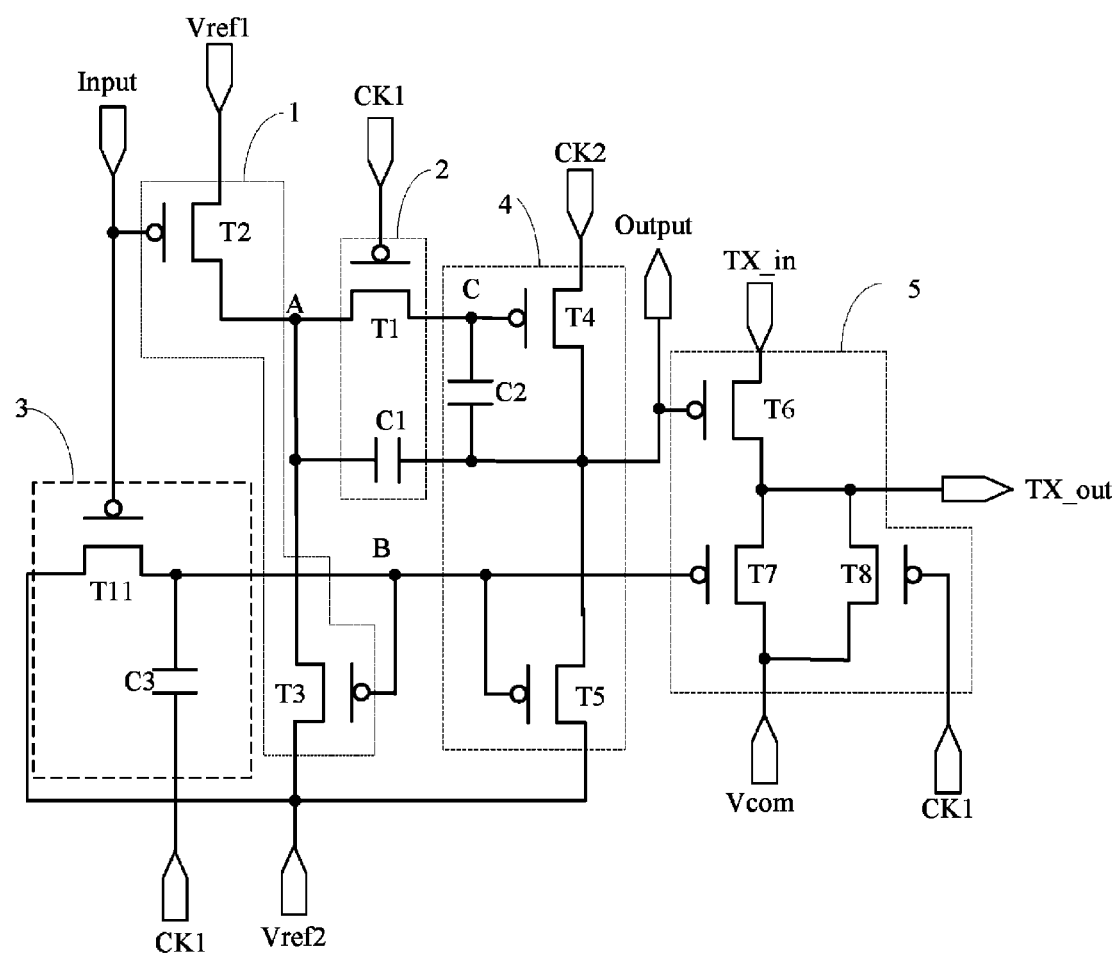
Figure 4C:
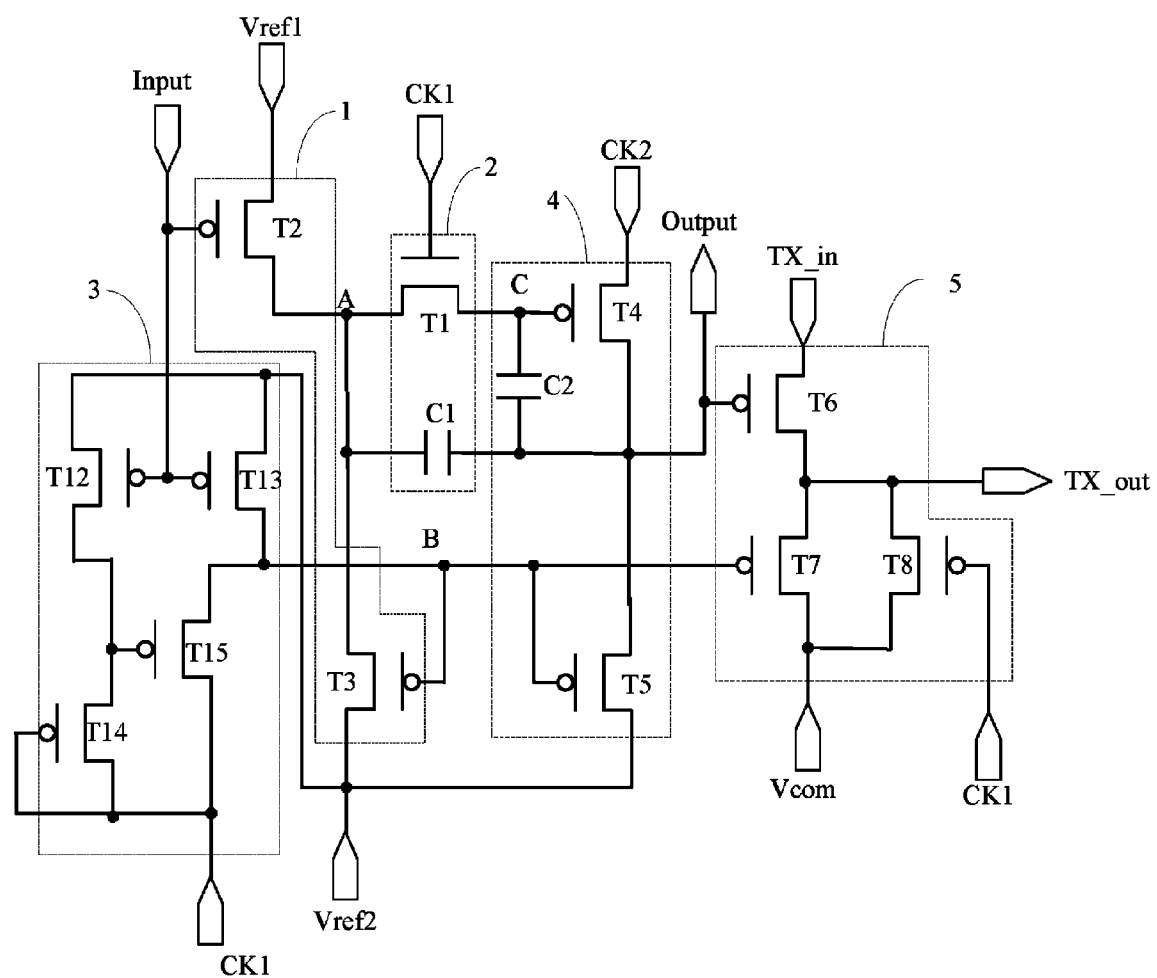

In a specific implementation, when the effective pulse signal at the shift input signal end is a high level signal, as shown in FIGS. 3a to 3c, the first switching transistor T1 is an N-type transistor; and when the effective pulse signal at the shift input signal end is a low level signal, as shown in FIGS. 4a to 4c, the first switching transistor T1 is a P-type transistor.

The above is merely an illustrative example of the specific structure of the first control sub-circuit. In a specific implementation, the structure of the first control sub-circuit is not limited to the above structure provided by the embodiments of the present disclosure, and may also be other structures known to those skilled in the art. No limitation will be given here.

For example, in the touch scanning circuit provided by the embodiments of the present disclosure, as shown in FIGS. 3a to 4c, the input sub-circuit 1 may include: a second switching transistor T2 and a third switching transistor T3.

A gate electrode of the second switching transistor T2 is connected with the shift input signal end Input; a source electrode is connected with the first reference signal end Vref1; and a drain electrode is connected with the first node A. A gate electrode of the third switching transistor T3 is connected with the second node B; a source electrode is connected with the second reference signal end Vref2; and a drain electrode is connected with the first node A.

In this case, when the shift input signal end Input controls the second switching transistor T2 to be in the switching-on state, the conducted second switching transistor T2 provides the signal of the first reference signal end Vref1 to the first node A; and when the second node B controls the third switching transistor T3 to be in the switching-on state, the conducted third switching transistor T3 provides the signal of the second reference signal end Vref2 to the first node A.

In a specific implementation, when the effective pulse signal at the shift input signal end is a high level signal, as shown in FIGS. 3a to 3c, the second switching transistor T2 and the third switching transistor T3 are N-type transistors; and when the effective pulse signal at the shift input signal end is a low level signal, as shown in FIGS. 4a to 4c, the second switching transistor T2 and the third switching transistor T3 are P-type transistors.

The above is merely an illustrative example of the specific structure of the input sub-circuit. In a specific implementation, the structure of the input sub-circuit is not limited to the above structure provided by the embodiments of the present disclosure, and may also be other structures known to those skilled in the art. No limitation will be given here.

For example, in the touch scanning circuit provided by the embodiments of the present disclosure, as shown in FIGS. 3a to 4c, the shift output sub-circuit 4 may include: a fourth switching transistor T4, a fifth switching transistor T5 and a second capacitor C2.

A gate electrode of the fourth switching transistor T4 is connected with the third node C; a source electrode is connected with the second clock signal end CK2; and a drain electrode is connected with the shift output end Output. A gate electrode of the fifth switching transistor T5 is connected with the second node B; a source electrode is connected with the second reference signal end Vref2; and a drain electrode is connected with the shift output end Output. The second capacitor C2 is connected between the third node C and the shift output end Output.

In this case, when the third node C controls the fourth switching transistor T4 to be in the switching-on state, the conducted fourth switching transistor T4 provides the signal of the second clock signal end CK2 to the shift output end Output; when the first control sub-circuit 2 controls the first node A and the third node C to be disconnected, the third node C is in a floating state, and the voltage difference between the third node C and the shift output end Output is kept stable due to the bootstrap function of the second capacitor C2; and when the second node B controls the fifth switching transistor T5 to be in the switching-on state, the conducted fifth switching transistor T5 provides the signal of the second reference signal end Vref2 to the shift output end Output.

In a specific implementation, when the effective pulse signal at the shift input signal end is a high level signal, as shown in FIGS. 3a to 3c, the fourth switching transistor T4 and the fifth switching transistor T5 are N-type transistors;

and when the effective pulse signal at the shift input signal end is a low level signal, as shown in FIGS. 4a to 4c, the fourth switching transistor T4 and the fifth switching transistor T5 are P-type transistors.

The above is merely an illustrative example of the specific structure of the shift output sub-circuit. In a specific implementation, the structure of the shift output sub-circuit is not limited to the above structure provided by the embodiments of the present disclosure, and may also be other structures known to those skilled in the art. No limitation will be given here.

For example, in the touch scanning circuit provided by the embodiments of the present disclosure, as shown in FIGS. 3a to 4c, the touch output sub-circuit 5 may include: a sixth switching transistor T6, a seventh switching transistor T7 and an eighth switching transistor T8.

A gate electrode of the sixth switching transistor T6 is connected with the shift output end Output; a source electrode is connected with the touch input signal end TX_in; and a drain electrode is connected with the touch output end TX_out. A gate electrode of the seventh switching transistor T7 is connected with the second node B; a source electrode is connected with the common signal end Vcom; and a drain electrode is connected with the touch output end TX_out. A gate electrode of the eighth switching transistor T8 is connected with the first clock signal end CK1; a source electrode is connected with the common signal end Vcom; and a drain electrode is connected with the touch output end TX_out.

In this case, when the shift output end Output controls the sixth switching transistor t6 to be in the switching-on state, the conducted sixth switching transistor T6 provides a signal of the touch input signal end TX_in to the touch output end TX_out; when the second node B controls the seventh switching transistor T7 to be in the switching-on state, the conducted seventh switching transistor T7 provides a signal of the common signal end Vcom to the touch output end TX_out; and when the first clock signal end CK1 controls the eighth switching transistor T8 to be in the switching-on state, the conducted eighth switching transistor T8 provides the signal of the common signal end Vcom to the shift output end Output.

In a specific implementation, when the effective pulse signal at the shift input signal end is a high level signal, as shown in FIGS. 3a to 3c, the sixth switching transistor T6, the seventh switching transistor T7 and the eighth switching transistor T8 are N-type transistors; and when the effective pulse signal at the shift input signal end is a low level signal, as shown in FIGS. 4a to 4c, the sixth switching transistor T6, the seventh switching transistor T7 and the eighth switching transistor T8 are P-type transistors.

The above is merely an illustrative example of the specific structure of the touch output sub-circuit. In a specific implementation, the structure of the touch output sub-circuit is not limited to the above structure provided by the embodiments of the present disclosure, and may also be other structures known to those skilled in the art. No limitation will be given here.

For example, in the touch scanning circuit provided by the embodiments of the present disclosure, as shown in FIGS. 3a and 4a, the second control sub-circuit 3 may include: a ninth switching transistor T9 and a tenth switching transistor T10.

A gate electrode of the ninth switching transistor T9 is connected with the shift input signal end Input; a source electrode is connected with the second reference signal end Vref2; and a drain electrode is connected with the second node B. Both a gate electrode and a source electrode of the tenth switching transistor T10 are connected with the first clock signal end CK1, and a drain electrode is connected with the second node B.

Optionally, the second control sub-circuit 3 may also include a third capacitor C3. The third capacitor C3 is connected between the second node B and the second reference signal end Vref2.

In this case, when the shift input signal end Input controls the ninth switching transistor T9 to be in the switching-on state, the conducted ninth switching transistor T9 provides the signal of the second reference signal end Vref2 to the second node B; and when the shift input signal end Input controls the ninth switching transistor T9 to be in the switching-off state and the first clock signal end CK1 controls the tenth switching transistor T10 to be in the switching-on state, the conducted tenth switching transistor T10 provides the signal of the first clock signal end CK1 to the second node B. In a specific implementation, width to length (W/L) ratios of channels of the ninth switching transistor T9 and the tenth switching transistor T10 are designed such that, when the shift input signal end Input controls the ninth switching transistor T9 to be in the switching-on state and the first clock signal end CK1 controls the tenth switching transistor T10 to be in the switching-on state, the signal of the second reference signal end Vref2 is provided to the second node B. In a specific implementation, when the effective pulse signal at the shift input signal end is a high level signal, as shown in FIG. 3a, the ninth switching transistor T9 and the tenth switching transistor T10 are N-type transistors; and when the effective pulse signal at the shift input signal end is a low level signal, as shown in FIG. 4a, the ninth switching transistor T9 and the tenth switching transistor T10 are P-type transistors.

Or, for example, in the touch scanning circuit provided by embodiments of the present disclosure, as shown in FIGS. 3b and 4b, the second control sub-circuit 3 may include: an eleventh switching transistor T11 and a third capacitor C3.

A gate electrode of the eleventh switching transistor T11 is connected with the shift input signal end Input; a source electrode is connected with the second reference signal end Vref2; and a drain electrode is connected with the second node B. The third capacitor C3 is connected between the second node B and the first clock signal end CK1.

The second node B in the touch scanning circuit as shown in FIG. 3b is also connected with a shift output end Output of a shift output sub-circuit in a next-stage touch scanning circuit through a twenty-first switching transistor (not shown). Specifically, the shift output end Output of the shift output sub-circuit in the next-stage touch scanning circuit is connected with a gate electrode and a drain electrode of the twenty-first switching transistor, and a source electrode of the twenty-first switching transistor is connected with the second node B. Or, the shift output end Output of the shift output sub-circuit in the next-stage touch scanning circuit is connected with the gate electrode of the twenty-first switching transistor, the drain electrode of the twenty-first switching transistor is connected with the first reference signal end Vref1; and the source electrode of the twenty-first switching transistor is connected with the second node B.

In this case, when the shift input signal end Input controls the eleventh switching transistor T11 to be in the switching-on state, the conducted eleventh switching transistor T11 provides the signal of the second reference signal end Vref2 to the second node B; and the signal of the first clock signal end CK1 is provided to the second node B through the third capacitor C3.

In a specific implementation, when the effective pulse signal at the shift input signal end is a high level signal, as shown in FIG. 3b, the eleventh switching transistor T11 is an N-type transistor, and when the effective pulse signal at the shift input signal end is a low level signal, as shown in FIG. 4b, the eleventh switching transistor T11 is a P-type transistor.

Or, for example, in the touch scanning circuit provided by embodiments of the present disclosure, as shown in FIGS. 3c and 4c, the second control sub-circuit 3 may include: a twelfth switching transistor T12, a thirteenth switching transistor T13, a fourteenth switching transistor T14 and a fifteenth switching transistor T15.

A gate electrode of the twelfth switching transistor T12 is connected with the shift input signal end Input; a source electrode is connected with the second reference signal end Vref2; and a drain electrode is connected with a gate electrode of the fifteenth switching transistor T15. A gate electrode of the thirteenth switching transistor T13 is connected with the shift input signal end Input; a source electrode is connected with the second reference signal end Vref2; and a drain electrode is connected with the second node B. Both a gate electrode and a source electrode of the fourteenth switching transistor T14 are connected with the first clock signal end CK1, and a drain electrode is connected with the gate electrode of the fifteenth switching transistor T15. A source electrode of the fifteenth switching transistor T15 is connected with the first clock signal end CK1, and a drain electrode is connected with the second node B.

Optionally, the second control sub-circuit 3 may further include a third capacitor C3. The third capacitor C3 is connected between the second node B and the second reference signal end Vref2.

In this case, when the shift input signal end Input controls the twelfth switching transistor T12 and the thirteenth switching transistor T13 to be in the switching-on state, the conducted twelfth switching transistor T12 provides the signal of the second reference signal end Vref2 to the gate electrode of the fifteenth switching transistor T15, and the conducted thirteenth switching transistor T13 provides the signal of the second reference signal end Vref2 to the second node B. When the shift input signal end Input controls the twelfth switching transistor T12 and the thirteenth switching transistor T13 to be in the switching-off state and the first clock signal end CK1 controls the fourteenth switching transistor T14 to be in the switching-on state, the conducted fourteenth switching transistor T14 provides the signal of the first clock signal end CK1 to the gate electrode of the fifteenth switching transistor T15. When the fifteenth switching transistor T15 is controlled by both the twelfth switching transistor T12 and the fourteenth switching transistor T14 to be in the switching-on state, the conducted fifteenth switching transistor T15 provides the signal of the first clock signal end CK1 to the second node B. In a specific implementation, the W/L ratios of channels of the twelfth switching transistor T12 and the fourteenth switching transistor T14 are designed such that the signal of the second reference signal end Vref2 is provided to the second node B when the shift input signal end Input controls the twelfth switching transistor T12 to be in the switching-on state and the first clock signal end CK1 controls the fourteenth switching transistor T14 to be in the switching-on state.

In a specific implementation, when the effective pulse signal at the shift input signal end is a high level signal, as shown in FIG. 3c, the twelfth switching transistor T12, the thirteenth switching transistor T13, the fourteenth switching transistor T14 and the fifteenth switching transistor T15 are N-type transistors; and when the effective pulse signal at the shift input signal end is a low level signal, as shown in FIG. 4c, the twelfth switching transistor T12, the thirteenth switching transistor T13, the fourteenth switching transistor T14 and the fifteenth switching transistor T15 are P-type transistors.

The above is merely an illustrative example of the specific structure of the second control sub-circuit. In a specific implementation, the specific structure of the second control sub-circuit is not limited to the above structure provided by the embodiments of the present disclosure, and may also be other structures known to those skilled in the art. No limitation will be given here.

For example, in the touch scanning circuit provided by the embodiments of the present disclosure, in order to simplify the manufacturing difficulty, the switching transistors generally adopt transistors of the same material. Therefore, in a specific implementation, all of the switching transistors adopt N-type transistors, or all of the switching transistors adopt P-type transistors. The N-type transistors are switched off under the control of low level signals and switched on under the control of high level signals. The P-type transistors are switched off under the control of high level signals and switched on under the control of low level signals.

It should be noted that the switching transistors in the embodiments of the present disclosure may be thin-film transistors (TFTs) and may also be metal oxide semiconductor field effect transistors (MOSFETs). No limitation will be given here. In a specific implementation, the functions of the source electrodes and the drain electrodes of the switching transistors may be exchanged according to different transistor types and input signals. No specific distinction will be given here.

Moreover, in a specific implementation, in the touch scanning circuit provided by the embodiments of the present disclosure, the switching transistors may be depletion-type transistors and may also be enhancement-type transistors. No limitation will be given here.

Description will be given below to a working process of the touch scanning circuit provided by the embodiments of the present disclosure by taking the touch scanning circuits as shown in FIGS. 3a to 3c as examples. In the following description, 1 represents a high level signal and 0 represents a low level signal.

FIRST EXAMPLE

Figure 5A:
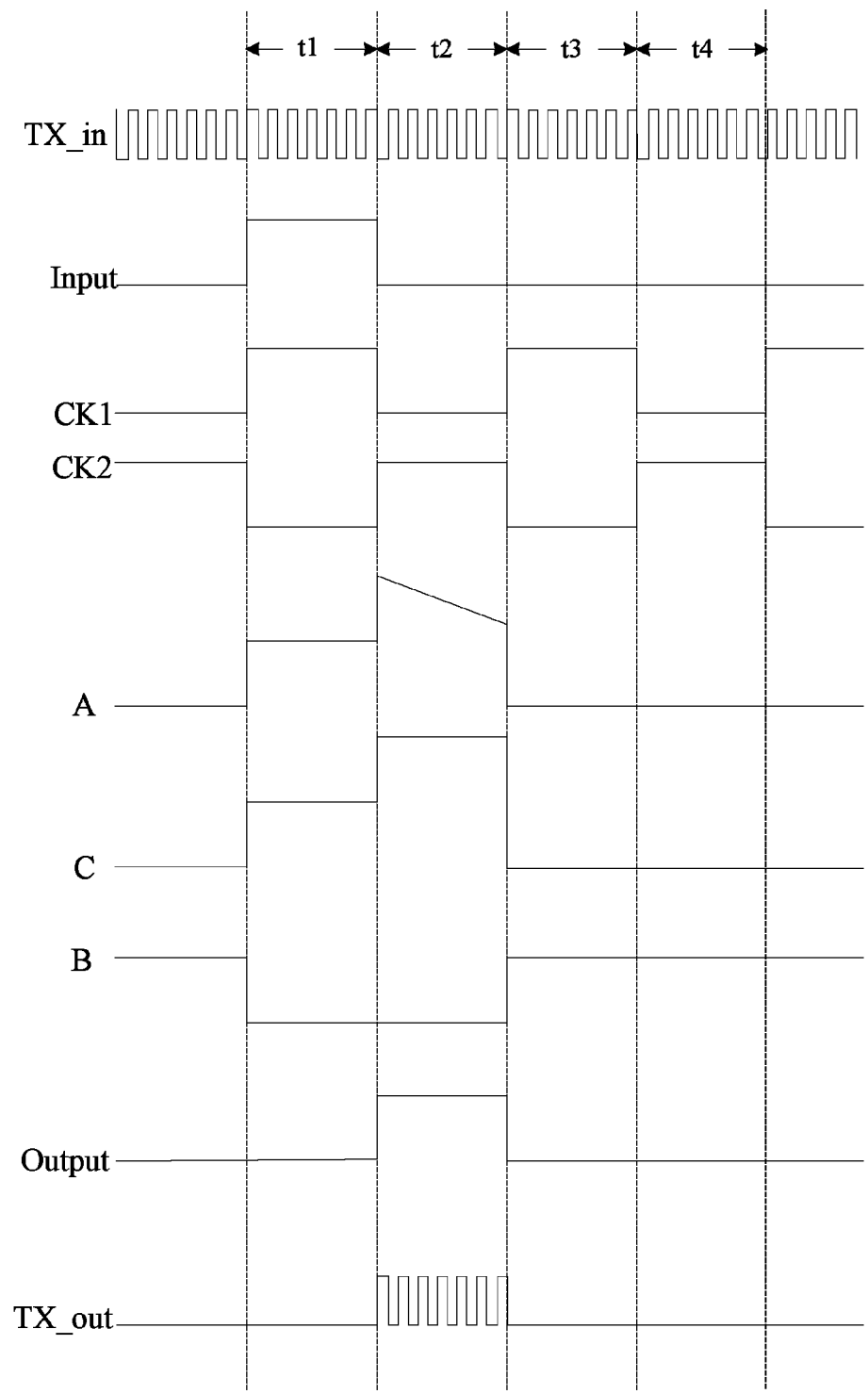
FIG. 5a is an input-output timing diagram corresponding to the touch scanning circuits as shown in FIGS. 3a and 3c.

Taking the touch scanning circuit as shown in FIG. 3a as an example, a corresponding input-output timing diagram is as shown in FIG. 5a. More specifically, four periods t1 to t4 in the input-output timing diagram as shown in FIG. 5a are selected.

At the t1 period, Input=1, CK1=1, CK2=0.

As Input=1, the second switching transistor T2 and the ninth switching transistor T9 are switched on; as CK1=1, the first switching transistor T1, the tenth switching transistor T10 and the eighth switching transistor T8 are switched on. A switching-on-state impedance of the ninth switching transistor T9 is far less than the switching on-state impedance of the tenth switching transistor T10 by a reasonable selection of the W/L ratios of channels of the ninth switching transistor T9 and the tenth switching transistor T10, so that the signal of the second reference signal end Vref2 can be provided to the second node. Hence, the second node B is in a low level; the second node B in the low level controls the third switching transistor T3, the fifth switching transistor T5 and the seventh switching transistor T7 to be switched off. A high level signal of the first reference signal end Vref1 is provided to the first node A through the conducted second switching transistor T2, so that the potential of the first node A is in a high level. As the first switching transistor T1 is switched on, the first node A and the third node C are in the connection state, and the potential of the third node C is in the high level. The third node C in the high level controls the fourth switching transistor T4 to be switched on, and a low level signal of the second clock signal end CK2 is provided to the shift output end Output through the conducted fourth switching transistor T4, so that the potential of the shift output end Output is in the low level. The shift output end Output in the low level controls the sixth switching transistor T6 to be switched off; and a common electrode signal of the common signal end Vcom is provided to the touch output end TX_out through the conducted eighth switching transistor T8, so that the touch output end TX_out outputs the common electrode signal.

At the t2 period: Input=0, CK1=0, CK2=1.

As Input=0, the second switching transistor T2 and the ninth switching transistor T9 are switched off; as CK1=0, the first switching transistor T1, the tenth switching transistor T10 and the eighth switching transistor T8 are switched off; the first node A and the third node C are in the floating state. At the beginning, the first node A and the third node C still maintain a high level, and the fourth switching transistor T4 is still in the switching-on state; the conducted fourth switching transistor T4 provides a high level signal of the second clock signal end CK2 to the shift output end Output. As the potential of the shift output end Output is changed from the low level at the t1 period to a high level at this period t2, the potential of the third node C is further pulled up due to the bootstrap function of the second capacitor C2. As the first switching transistor T1 is switched off; even if the potential of the first node A may be instable due to a leakage current of the third switching transistor T3, the potential of the third node C may not be affected. As the potential of the shift output end Output is changed from the low level at the t1 period to the high level at this period, the potential of the first node A is also further pulled up due to the bootstrap function of the first capacitor C1, so as to ensure that the potential of the gate electrode of the first switching transistor T1 is far less than the potential of the first node A and the potential of the third node C, and hence ensure that the first switching transistor T1 is switched off. As both the ninth switching transistor T9 and the tenth switching transistor T10 are switched off, the potential of the second node B is still in the low level, and the second node B in the low level controls the third switching transistor T3, the fifth switching transistor T5 and the seventh switching transistor T7 to be switched off. The shift output end Output in the high level controls the sixth switching transistor T6 to be switched on; and a touch scanning signal of the touch input signal end TX_in is provided to the touch output end TX_out through the sixth switching transistor T6, so that the touch output end TX_out outputs the touch scanning signal.

At the t3 period: Input=0, CK1=1, CK2=0.

As Input=0, the second switching transistor T2 and the ninth switching transistor T9 are switched off; as CK1=1, the first switching transistor T1, the tenth switching transistor T10 and the eighth switching transistor T8 are switched on. A high level signal of the first clock signal end CK1 is provided to the second node B through the conducted tenth switching transistor T10, so that the potential of the second node B is in the high level. The high level second node B controls the third switching transistor T3, the fifth switching transistor T5 and the seventh switching transistor T7 to be switched on, and a low level signal of the second reference signal end Vref2 is respectively provided to the first node A through the conducted third switching transistor T3 and provided to the shift output end Output through the conducted fifth switching transistor T5. Thus, the potential of both the first node A and the shift output end Output are in the low level; the conducted first switching transistor T1 allows the first node A and the third node C to be connected, so that the third node C is also in the low level. The third node C in the low level controls the fourth switching transistor T4 to be switched off; the shift output end Output in the low level controls the sixth switching transistor T6 to be switched off. A common electrode signal of the common signal end Vcom is provided to the touch output end TX_out through the conducted seventh switching transistor T7 and the conducted eighth switching transistor T8, so that the touch output end TX_out outputs the common electrode signal. In addition, when the third capacitor C3 is provided, the third capacitor C3 is charged at the t3 period.

At the t4 period: Input=0, CK1=0, CK2=1.

As Input=0, the second switching transistor T2 and the ninth switching transistor T9 are switched off; as CK1=0, the first switching transistor T1, the tenth switching transistor T10 and the eighth switching transistor T8 are switched off. As both the ninth switching transistor T9 and the tenth switching transistor T10 are switched off, the second node B is in the floating state, but the switching transistors (for instance, the third switching transistor T3 and the fifth switching transistor T5) connected with the second node B have parasitic capacitors. Due to the voltage maintaining function of the parasitic capacitors, and also due to the voltage maintaining function of the third capacitor C3 if the third capacitor C3 is provided, the second node B still maintains the high level at the previous period. The second node B in the high levels controls the third switching transistor T3, the fifth switching transistor T5 and the seventh switching transistor T7 to be switched on, and the low level signal of the second reference signal Vref2 is respectively provided to the first node A through the conducted third switching transistor T3 and provided to the shift output end Output through the conducted fifth switching transistor T5. Thus, the potential of both the first node A and the shift output end Output are in the low level. The first switching transistor T1 allows the first node A and the third node C to be disconnected, so that the third node C still maintains the low level, and the third node C in the low level controls the fourth switching transistor T4 to be switched off. The shift output end Output in the low level controls the sixth switching transistor T6 to be switched off; and a common electrode signal of the common signal end Vcom is provided to the touch output end TX_out through the conducted seventh switching transistor T7, so that the touch output end TX_out outputs the common electrode signal.

Subsequently, the third period and the fourth period are alternately executed until the shift input signal end receives a high level signal again. The touch scanning circuit can solve the problem of output failure due to a large leakage current of depletion type MOS tubes in a conventional single touch scanning circuit, by the addition of the first switching transistor between the first node and the third node and the addition of the first capacitor between the shift output end and the first node. Therefore, the above touch scanning circuit is applicable for depletion-type touch scanning circuits with a single metal oxide semiconductor (MOS) structure. Compared with a touch scanning circuit with a complementary metal oxide semiconductor (CMOS) structure, the development reliability is high, the structure is simple, the number of the switching transistors is less, and the bezel width of the display panel can be reduced.

Figure 6A:
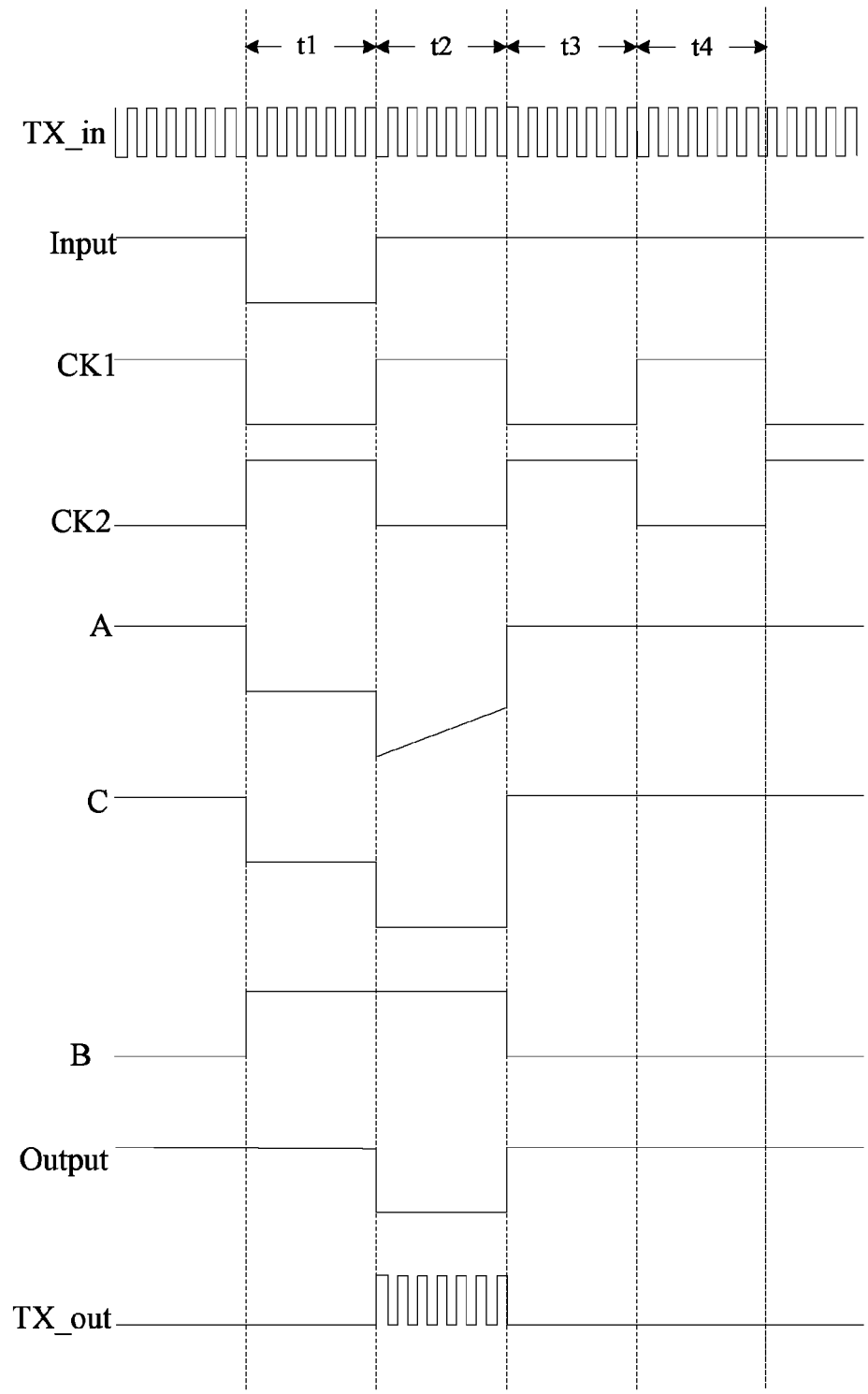
FIG. 6a is an input-output timing diagram corresponding to the touch scanning circuits as shown in FIGS. 4a and 4c.

Description is given in the first example by taking the N-type transistors as an example. As for a touch scanning circuit formed by the P-type transistors as shown in FIG. 4a, a corresponding input-output timing diagram is as shown in FIG. 6a. The principle is the same as that of the first example. The difference includes that a P-type transistor is switched off when the potential of the gate electrode is in a high level and switched on when the potential of the gate electrode is in a low level.

SECOND EXAMPLE

Figure 5B:
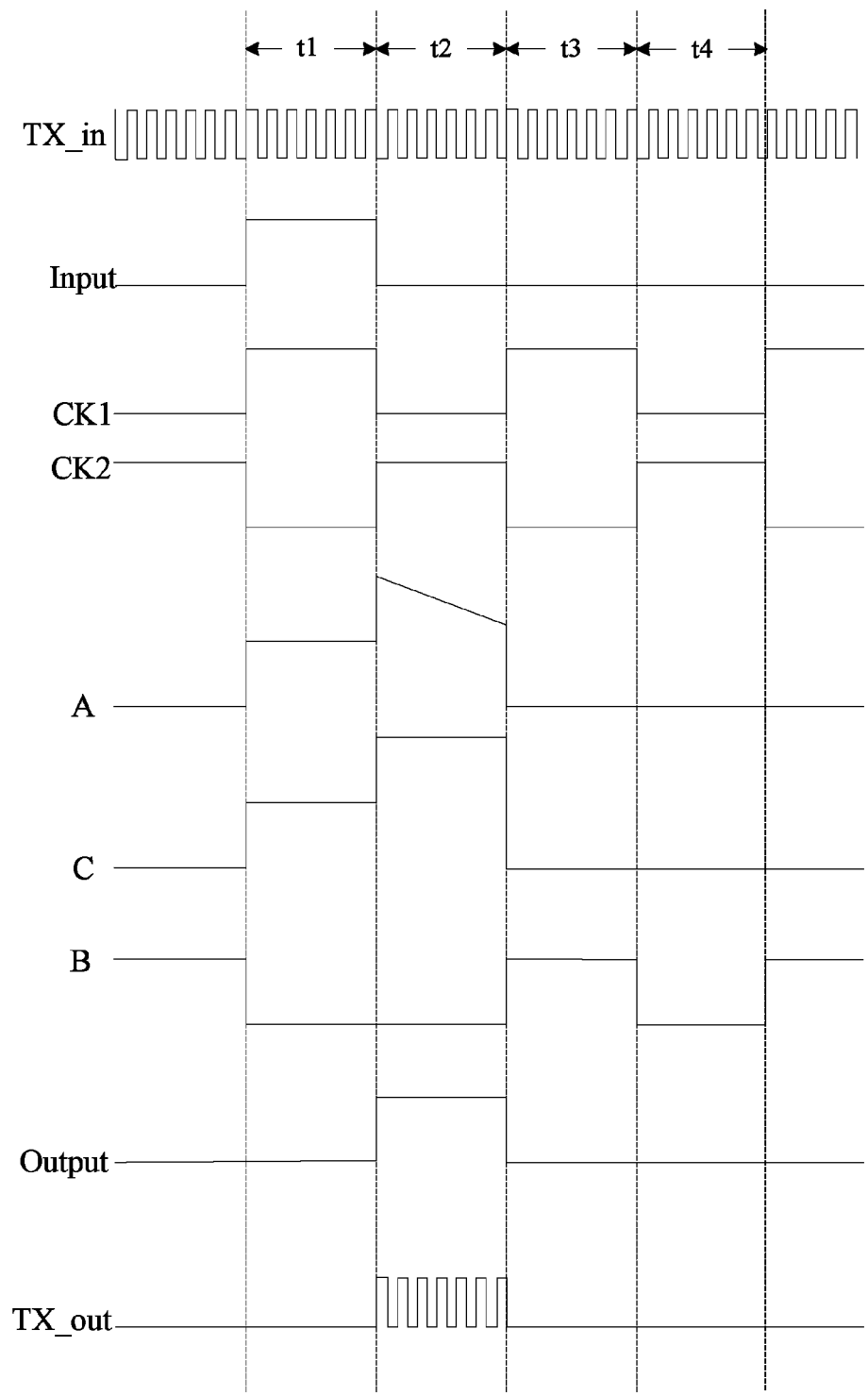
FIG. 5b is an input-output timing diagram corresponding to the touch scanning circuit as shown in FIG. 3b.

Taking the touch scanning circuit as shown in FIG. 3b as an example, a corresponding input-output timing diagram is as shown in FIG. 5b. More specifically, four periods t1-t4 in the input-output timing diagram as shown in FIG. 5b are selected.

At the t1 period: Input=1, CK1=1, CK2=0.

As Input=1, the second switching transistor T2 and the eleventh switching transistor T11 are switched on; as CK1=1, the first switching transistor T1 and the eighth switching transistor T8 are switched on. A low level signal of the second reference signal end Vref2 is provided to the second node B through the conducted eleventh switching transistor T11; meanwhile, the first clock signal end CK1 begins to charge the fourth capacitor C4. The potential of the second node B is in the low level, and the second node B in the low level controls the third switching transistor T3, the fifth switching transistor T5 and the seventh switching transistor T7 to be switched off. A high level signal of the first reference signal end Vref1 is provided to the first node A through the conducted second switching transistor T2, so that the potential of the first node A is in the high level. As the first switching transistor T1 is switched on, the first node A and the third node C are in the connecting state, so that the potential of the third node C is in the high level. The third node C in the high level controls the fourth switching transistor T4 to be switched on, and a low level signal of the second clock signal end CK2 is provided to the shift output end Output through the conducted fourth switching transistor T4, so that the potential of the shift output end Output is in the low level. The shift output end Output in the low level controls the sixth switching transistor T6 to be switched off; and the common electrode signal of the common signal end Vcom is provided to the touch output end TX_out through the conducted eighth switching transistor T8, so that the touch output end TX_out outputs the common electrode signal.

At the t2 period: Input=0, CK1=0, CK2=1.

As Input=0, the second switching transistor T2 and the eleventh switching transistor T11 are switched off; as CK1=0, the first switching transistor T1 and the eighth switching transistor T8 are switched off; the first node A and the third node C are in the floating state. At the beginning, the first node A and the third node C still maintain the high level, and the fourth switching transistor T4 is still in the switching-on state; the conducted fourth switching transistor T4 provides a high level signal of the second clock signal end CK2 to the shift output end Output. As the potential of the shift output end Output is changed from the low level at the t1 period to the high level at this period, the potential of the third node C is further pulled up due to the bootstrap function of the second capacitor C2; as the first switching transistor T1 is switched off, even when the potential of the first node A may be instable due to the leakage current of the third switching transistor T3, the potential of the third node C may not be affected. As the potential of the shift output end Output is changed from the low level at the t1 period to the high level at this period, due to the bootstrap function of the first capacitor C1, the potential of the first node A is also further pulled up, so as to ensure that the potential of the gate electrode of the first switching transistor T1 is far less than the potential of the first node A and the potential of the third node C, and then ensure the switching off of the first switching transistor T1. As the eleventh switching transistor T11 is switched off, the signal of the first clock signal end CK1 is changed to a low level signal; the third capacitor C3 begins discharging; the potential of the second node B is still in the low level; the second node B in the low level controls the third switching transistor T3, the fifth switching transistor T5 and the seventh switching transistor T7 to be switched off; the shift output end Output in the high level controls the sixth switching transistor T6 to be switched on; and a touch scanning signal of the touch input signal end TX_in is provided to the touch output end TX_out through the sixth switching transistor T6, so that the touch output end TX_out outputs the touch scanning signal.

At the t3 period: Input=0, CK1=1, CK2=0.

As Input=0, the second switching transistor T2 and the eleventh switching transistor T11 are switched off; as CK1=1, the first switching transistor T1 and the eighth switching transistor T8 are switched on; as a shift output end Output of a shift output sub-circuit in the next-stage touch scanning circuit outputs a high level "1", the twenty-first switching transistor connected with the shift output end Output is switched on, and the potential of the second node B is changed to the high potential. At this point, as the signal of the first clock signal end CK1 is also converted into a high level signal, the third capacitor C3 is discharged; the second node B in the high level controls the third switching transistor T3, the fifth switching transistor T5 and the seventh switching transistor T7 to be switched on, and a low level signal of the second reference signal end Vref2 is respectively provided to the first node A through the conducted third switching transistor T3 and provided to the shift output end Output through the conducted fifth switching transistor T5, so that the potential of both the first node A and the shift output end Output are in the low level. The conducted first switching transistor T1 allows the first node A and the third node C to be connected, so that the third node C is also in the low level. The third node C in the low level controls the fourth switching transistor T4 to be switched off; the shift output end Output in the low level controls the sixth switching transistor T6 to be switched off; and a common electrode signal of the common signal end Vcom is provided to the touch output end TX_out through the conducted seventh switching transistor T7 and the conducted eighth switching transistor T8, so that the touch output end TX_out outputs the common electrode signal.

At the t4 period: Input=0, CK1=0, CK2=1.

As Input=0, the second switching transistor T2 and the eleventh switching transistor T11 are switched off; as CK1=0, the first switching transistor T1 and the eighth switching transistor T8 are switched off. As the shift output end Output of the shift output sub-circuit in the next-stage touch scanning circuit outputs the low level signal "0", the twenty-first switching transistor connected with the shift output end Output in the next-stage touch scanning circuit is switched off. Meanwhile, as the signal of the first clock signal end CK1 is also converted into a low level signal, due to the voltage coupling function of the third capacitor C3, the potential of the second node B is converted into the low level. The second node B in the low level controls the third switching transistor T3, the fifth switching transistor T5 and the seventh switching transistor T7 to be switched off. As the second switching transistor T2 and the third switching transistor T3 are switched off, the first node A is in the floating state and maintains the low level. The first switching transistor T1 allows the first node A and the third node C to be disconnected, so that the third node C is in the floating state and still maintains the low level. The third node C in the low level controls the fourth switching transistor T4 to be switched off; as the fourth switching transistor T4 and the fifth switching transistor T5 are switched off, the shift output end Output is in the floating state and still maintains the low level. The shift output end Output in the low level controls the sixth switching transistor T6 to be switched off, so that the touch output end TX_out has no signal output.

Subsequently, the third period and the fourth period are alternately executed until the shift input signal end receives a high level signal again. The touch scanning circuit can solve the problem of output failure due to a large leakage current of depletion-type MOS tubes in a conventional single touch scanning circuit, by the addition of the first switching transistor between the first node and the third node and the addition of the first capacitor between the shift output end and the first node. Therefore, the above touch scanning circuit is applicable for depletion-type touch scanning circuits with a single MOS structure. Compared with a touch scanning circuit with a CMOS structure, the development reliability is high, the structure is simple, the number of the switching transistors is less, and the bezel width of display panels can be reduced.

Figure 6B:
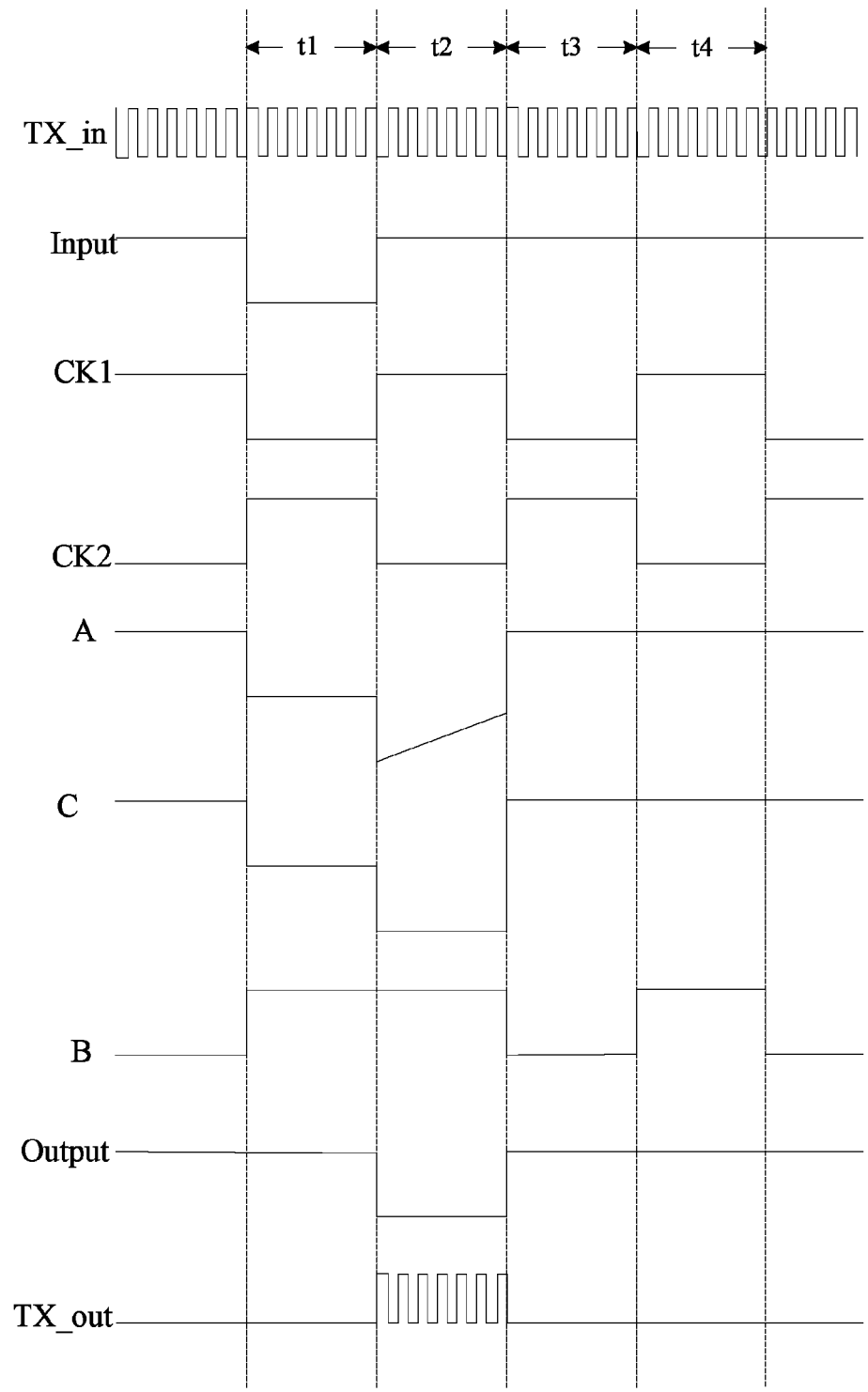
FIG. 6b is an input-output timing diagram corresponding to the touch scanning circuit as shown in FIG. 4b.

Description is given in the second example by taking the N-type transistors as an example. As for a touch scanning circuit formed by the P-type transistors as shown in FIG. 4b, a corresponding input-output timing diagram is as shown in FIG. 6b. The principle is the same as that of the second example. The difference includes that a P-type transistor is switched off when the potential of the gate electrode is in the high level and switched on when the potential of the gate electrode is in the low level.

THIRD EXAMPLE

Taking the touch scanning circuit as shown in FIG. 3c as an example, a corresponding input-output timing diagram is as shown in FIG. 5a. More specifically, the four periods t1-t4 in the input-output timing diagram as shown in FIG. 5a are selected.

At the t1 period: Input=1, CK1=1, CK2=0.

As Input=1, the second switching transistor T2, the twelfth switching transistor T12 and the thirteenth switching transistor T13 are switched on; as CK1=1, the first switching transistor T1, the fourteenth switching transistor T14 and the eighth switching transistor T8 are switched on. A switching-on-state impedance of the twelfth switching transistor T12 is far greater than a switching-on-state impedance of the fourteenth switching transistor T14 by reasonable selection of the W/L ratios of channels of the twelfth switching transistor T12 and the fourteenth switching transistor T14, so that a high level signal of the first clock signal end CK1 can be provided to the gate electrode of the fifteenth switching transistor T15 through the conducted fourteenth switching transistor T14. Hence, the fifteenth switching transistor T15 is switched on. A switching-on-state impedance of the thirteenth switching transistor T13 is far less than a switching-on-state impedance of the fifteenth switching transistor T15 by reasonable selection of the W/L ratios of channels of the thirteenth switching transistor T13 and the fifteenth switching transistor T15, so that a low level signal of the second reference signal end Vref2 can be provided to the second node B through the conducted thirteenth switching transistor T13, and hence the second node B is in the low level; the second node B in the low level controls the third switching transistor T3, the fifth switching transistor T5 and the seventh switching transistor T7 to be switched off. A high level signal of the first reference signal end Vref1 is provided to the first node A through the conducted second switching transistor T2, so that the potential of the first node A is in the high level. As the first switching transistor T1 is switched on, the first node A and the third node C are in the connecting state, and the potential of the third node C is also in the high level. The third node C in the high level controls the fourth switching transistor T4 to be switched on; a low level signal of the second clock signal end CK2 is provided to the shift output end Output through the conducted fourth switching transistor T4, so that the potential of the shift output end Output is in the low level. The shift output end Output in the low level controls the sixth switching transistor T6 to be switched off; and a common electrode signal of the common signal end Vcom is provided to the touch output end TX_out through the conducted eighth switching transistor T8, so that the touch output end TX_out outputs the common electrode signal.

At the t2 period: Input=0, CK1=0, CK2=1.

As Input=0, the second switching transistor T2, the twelfth switching transistor T12 and the thirteenth switching transistor T13 are switched off; as CK1=0, the first switching transistor T1, the fourteenth switching transistor T14 and the eighth switching transistor T8 are switched off; the first node A and the third node C are in the floating state. At the beginning, the first node A and the third node C still maintain the high level, and the fourth switching transistor T4 is still in the switching-on state; the conducted fourth switching transistor T4 provides a high level signal of the second clock signal end CK2 to the shift output end Output. As the potential of the shift output end Output is converted into the high level at this period from the low level at the t1 period, the potential of the third node C is further pulled up due to the bootstrap function of the second capacitor C2. As the first switching transistor T1 is switched off, even when the potential of the first node A may be instable due to the leakage current of the third switching transistor T3, the potential of the third node C may not be affected. As the potential of the shift output end Output is converted into the high level at this period from the low level at the t1 period, due to the bootstrap function of the first capacitor C1, the potential of the first node A is also further pulled up, so as to ensure that the potential of the gate electrode of the first switching transistor T1 is far less than the potential of the first node A and the potential of the third node C, and then ensure the first switching transistor T1 to be switched off. As both the twelfth switching transistor T12 and the fourteenth switching transistor T14 are switched off, the fifteenth switching transistor is switched off. As both the fifteenth switching transistor T15 and the thirteenth switching transistor T13 are switched off, the potential of the second node B is still in the low level. The second node B in the low level controls the second switching transistor T3, the fifth switching transistor T5 and the seventh switching transistor T7 to be switched off. The shift output end Output in the high level controls the sixth switching transistor T6 to be switched on; and a touch scanning signal of the touch input signal end TX_in is provided to the touch output end TX_out through the sixth switching transistor T6, so that the touch output end TX_out outputs the touch scanning signal.

At the t3 period: Input=0, CK1=1, CK2=0.

As Input=0, the second switching transistor T2, the twelfth switching transistor T12 and the thirteenth switching transistor T13 are switched of; as CK1=1, the first switching transistor T1, the fourteenth switching transistor T14 and the eighth switching transistor T8 are switched on. The high level signal of the first clock signal end CK1 is provided to the gate electrode of the fifteenth switching transistor T15 through the conducted fourteenth switching transistor T14, so the fifteenth switching transistor T15 is switched on. The high level signal of the first clock signal end CK1 is provided to the second node B through the conducted fifteenth switching transistor T15, so that the potential of the second node B is in the high level. The second node B in the high level controls the third switching transistor T3, the fifth switching transistor T5 and the seventh switching transistor T7 to be switched on. The low level signal of the second reference signal end Vref2 is respectively provided to the first node A through the conducted third switching transistor T3 and provided to the shift output end Output through the conducted fifth switching transistor T5. Thus, the potential of both the first node A and the shift output end Output are in the low level; the conducted first switching transistor T1 allows the first node A and the third node C to be connected, so that the third node C is also in the low level. The third node C in the low level controls the fourth switching transistor T4 to be switched off. The shift output end Output in the low level controls the sixth switching transistor T6 to be switched off; and the common electrode signal of the common signal end Vcom is provided to the touch output end TX_out through the conducted seventh switching transistor T7 and the eighth switching transistor T8, so that the touch output end TX_out outputs the common electrode signal. In addition, if the third capacitor C3 is provided, the third capacitor C3 is charged at this period.

At the t4 period: Input=0, CK1=0, CK2=1.

As Input=–0, the second switching transistor T2, the twelfth switching transistor T12 and the thirteenth switching transistor T13 are switched off; as CK1=0, the first switching transistor T1, the fourteenth switching transistor T14 and the eighth switching transistor T8 are switched off. As both the twelfth switching transistor T12 and the fourteenth switching transistor T14 are switched off, the fifteenth switching transistor is switched off. As both the fifteenth switching transistor T15 and the thirteenth switching transistor T13 are switched off, the second node B is in the floating state, but the switching transistors (for instance, the third switching transistor T3 and the fifth switching transistor T5) connected with the second node B have parasitic capacitors. Due to the voltage maintaining function of the parasitic capacitors, and also due to the voltage maintaining function of the third capacitor C3 if the third capacitor C3 is provided, the second node B still maintains the high level at the previous period. The second node B in the high level controls the third switching transistor T3, the fifth switching transistor T5 and the seventh switching transistor T7 to be switched on; the low level signal of the second reference signal end Vref2 is respectively provided to the first node A through the conducted third switching transistor T3 and provided to the shift output end Output through the conducted fifth switching transistor T5. Thus, the potential of both the first node A and the shift output end Output are in the low level. The first switching transistor T1 allows the first node A and the third node C to be disconnected, so that the third node C still maintains the low level. The third node C in the low level controls the fourth switching transistor T4 to be switched off. The shift output end Output in the low level controls the sixth switching transistor T6 to be switched off; and the common electrode signal of the common signal end Vcom is provided to the touch output end TX_out through the conducted seventh switching transistor T7, so that the touch output end TX_out outputs the common electrode signal.

Subsequently, the third period and the fourth period are alternately executed until the shift input signal end receives a high level signal again. The touch scanning circuit can solve the problem of output failure due to a large leakage current of depletion-type MOS tubes in a conventional single touch scanning circuit, by the addition of the first switching transistor between the first node and the third node and the addition of the first capacitor between the shift output end and the first node. Therefore, the above touch scanning circuit is applicable for depletion-type touch scanning circuits with a single MOS structure. Compared with a touch scanning circuit with a CMOS structure, the development reliability is high, the structure is simple, the number of the switching transistors is less, and the bezel width of display panels can be reduced.

Description is given in the third example by taking the N-type transistors as an example. As for a touch scanning circuit formed by the P-type transistors as shown in FIG. 4c, a corresponding input-output timing diagram is as shown in FIG. 6a. The principle is the same as that of the third example. The difference includes that a P-type transistor is switched off when the potential of the gate electrode is in the high level and switched on when the potential of the gate electrode is in the low level.

Figure 7:
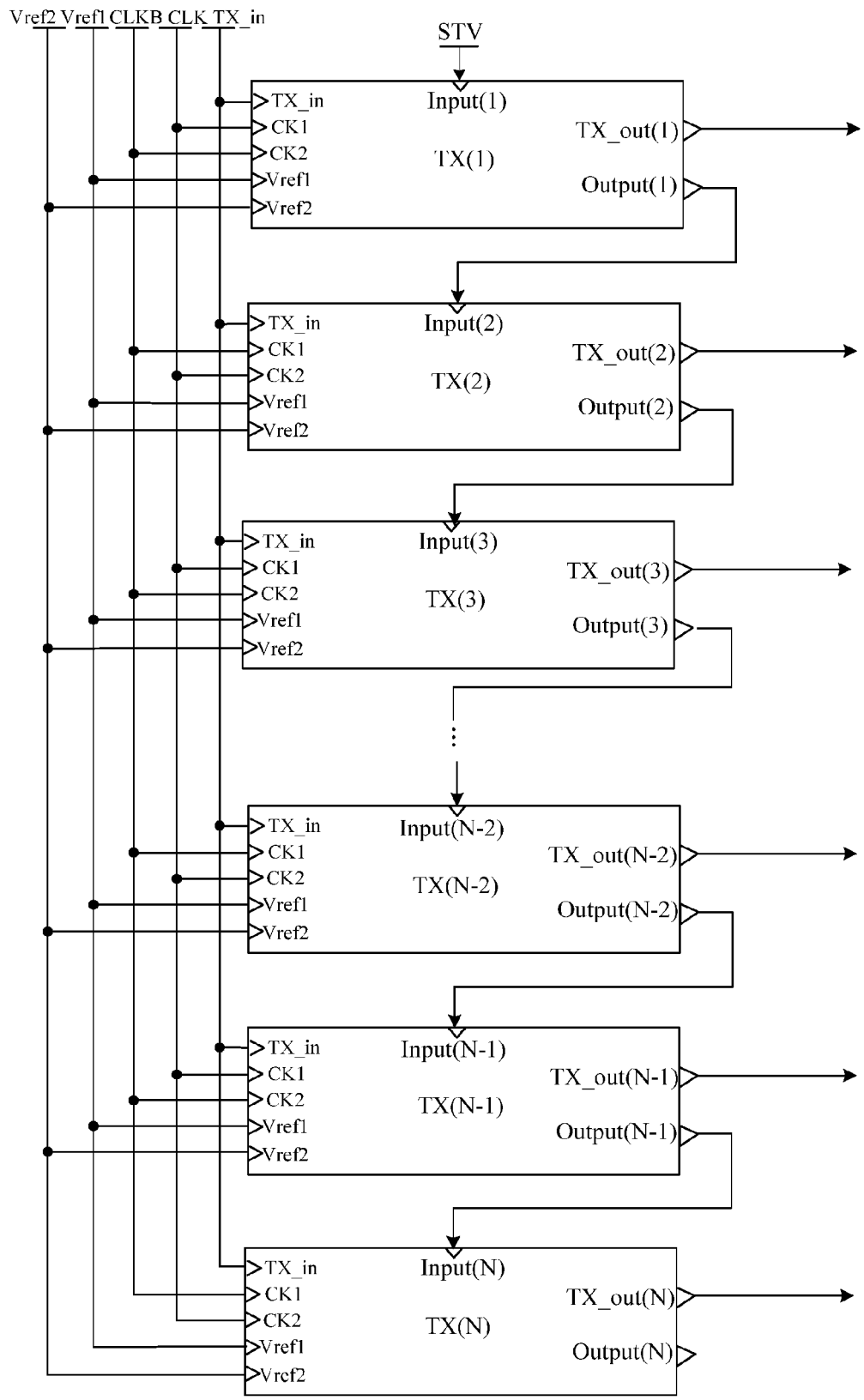
FIG. 7 is a schematic structural view of a touch driving circuit provided by an embodiment of the present disclosure.

On the basis of the same inventive concept, an embodiment of the present disclosure further provides a touch driving circuit, which, as shown in FIG. 7, comprises a plurality of any foregoing touch scanning circuits provided by the embodiments of the present disclosure in a cascade connection: TX(1), TX(2) . . . TX(n) . . . TX(N−1), TX(N) (N touch scanning circuits in total, 1≤n≤N), where:

except a final-stage touch scanning circuit TX(N), a shift output end Output(n) in each of the remaining touch scanning circuits TX(n) is respectively connected with a shift input signal end in a next-stage touch scanning circuit TX(n+1) that is adjacent to the touch scanning circuit TX(n); and a shift input signal end Input (1) in a first-stage touch scanning circuit TX(1) is connected with a frame start signal end STV.

Moreover, in the touch driving circuit provided by the embodiments of the present disclosure, as shown in FIG. 7, first reference signal ends Vref1 of the touch scanning circuits are connected with the same first reference signal end Vref1; second reference signal ends Vref2 of the touch scanning circuits are connected with the same second reference signal end Vref2; first clock signal ends CK1 of the touch scanning circuits in odd stages and second clock signal ends CK2 of the touch scanning circuits in even stages are connected with the same first clock end CLK; and second clock signal ends CK2 of the touch scanning circuits in the odd stages and first clock signal end CK1 of the touch scanning circuits in the even stages are connected with the same second clock end CLKB.

Based on the same inventive concept, an embodiment of the present disclosure further provides a touch panel, which comprises a plurality of touch scanning lines disposed on an array substrate in the touch panel, and a touch driving circuit disposed at the border of the array substrate and configured to sequentially output touch scanning signals to the touch scanning lines. The touch driving circuit is the touch driving circuit provided by the embodiments of the present disclosure. As the principle of the touch panel in solving problems is similar to the foregoing touch driving circuit, the embodiments of the touch panel may be referred to with reference to the embodiments of the touch driving circuit. No further description will be given here.

On the basis of the same inventive concept, an embodiment of the present disclosure further provides a driving method of any forgoing touch scanning circuit.

At an input period, the input sub-circuit provides the signal of the first reference signal end to the first node under the control of the shift input signal end; the second control sub-circuit provides the signal of the second reference signal end to the second node under the control of the shift input signal end; the first control sub-circuit allows the first node and the third node to be in the connecting state under the control of the first clock signal end; the shift output sub-circuit provides the signal of the second clock signal end to the shift output end under the control of the third node; and the touch output sub-circuit provides the signal of the common signal end to the touch output end under the control of the first clock signal end.

At an output period, the first node and the third node are in the floating state; the first control sub-circuit allows the voltage difference between the first node and the shift output end to be kept stable; the shift output sub-circuit allows the voltage difference between the third node and the shift output end to be kept stable; the shift output sub-circuit provides the signal of the second clock signal end to the shift output end under the control of the third node; and the touch output sub-circuit provides the signal of the touch input signal end to the touch output end under the control of the shift output end.

At a first maintaining period, the second control sub-circuit provides the signal of the first clock signal end to the second node under the control of the first clock signal end; the input sub-circuit provides the signal of the second reference signal end to the first node under the control of the second node; the first control sub-circuit allows the first node and the third node to be in the connecting state under the control of the first clock signal end; the shift output sub-circuit provides the signal of the second reference signal end to the shift output end under the control of the second node; and the touch output sub-circuit provides the signal of the common signal end to the touch output end under the control of the second node and the first clock signal end.

At a second maintaining period, the second control sub-circuit maintains the potential of the second node; the input sub-circuit provides the signal of the second reference signal end to the first node under the control of the second node; the first control sub-circuit allows the first node and the third node to be disconnected under the control of the first clock signal end; the shift output sub-circuit maintains the potential of the third node and provides the signal of the second reference signal end to the shift output end under the control of the second node; and the touch output sub-circuit provides the signal of the common signal end to the touch output end under the control of the second node.

Alternatively, at the second maintaining period, the second control sub-circuit allows the second node and the second reference signal end to have the same potential; the first control sub-circuit allows the first node and the third node to be disconnected under the control of the first clock signal end; the shift output sub-circuit maintains the potential of the third node and maintains the potential of the shift output end; and the touch output sub-circuit does not provide an output signal to the touch output end.

It should be noted that the input period here corresponds to the t1 period in the first example, the second example and the third example; the output period corresponds to the t2 period in the first example, the second example and the third example; the first maintaining period corresponds to the t3 period in the first example, the second example and the third example; and the second maintaining period corresponds to the t4 period in the first example, the second example and the third example.

Embodiments of the present disclosure provide a touch scanning circuit, a driving method thereof, a touch driving circuit and a touch panel. The touch scanning circuit, the driving method thereof, the touch driving circuit and the touch panel comprises: an input sub-circuit, a first control sub-circuit, a second control sub-circuit, a shift output sub-circuit and a touch output sub-circuit, where: the input sub-circuit is configured to control the potential of a first node; the first control sub-circuit is configured to control the connection and disconnection between the first node and a third node; the second control sub-circuit is configured to control the potential of a second node; the shift output sub-circuit is configured to control the potential of a shift output end according to the third node and the second node; and the touch output sub-circuit is configured to control a signal outputted by a touch output end according to the second node, the touch output end and a first clock signal end. The touch scanning circuit with a simple structure is implemented by the cooperation of the above five sub-circuits. Moreover, as the first control sub-circuit may control the connection and disconnection between the first node and the third node, the influence of instable potential of the first node on the potential of the third node can be avoided, and hence the output stability of the touch scanning circuit can be guaranteed.

Obviously, various modifications and deformations may be made to the present disclosure by those skilled in the art without departing from the spirit and scope of the present disclosure. Therefore, if the modifications and deformations of the present disclosure fall within the scope of the appended claims of the present disclosure and equivalents thereof, the present disclosure is also intended to include the modifications and deformations.

The present application claims the priority of the Chinese Patent Application No. 201610018412.7 titled "touch scanning circuit and driving method thereof, touch driving circuit and touch panel" and filed on Jan. 12, 2016, which is incorporated herein by reference in its entirety as part of the disclosure of the present application.

What is claimed is:

1. A touch scanning circuit, comprising: an input sub-circuit, a first control sub-circuit, a second control sub-circuit, a shift output sub-circuit and a touch output sub-circuit, wherein:

a first end of the input sub-circuit is connected with a shift input signal end, a second end is connected with a first reference signal end, a third end is connected with a second reference signal end, a fourth end is connected with a first node, and a fifth end is connected with a second node; the input sub-circuit is configured to provide a signal of the first reference signal end to the first node under control of the shift input signal end, and provide a signal of the second reference signal end to the first node under control of the second node;

a first end of the first control sub-circuit is connected with the first node, a second end is connected with a first clock signal end, a third end is connected with a third node, and a fourth end is connected with a shift output end; the first control sub-circuit is configured to allow the first node and the third node to be in a connecting state under control of the first clock signal end, and allow a voltage difference between the first node and the shift output end to be kept stable when the first node is in a floating state;

a first end of the second control sub-circuit is connected with the second node, a second end is connected with the shift input signal end, a third end is connected with the first clock signal end, and a fourth end is connected with the second reference signal end; the second control sub-circuit is configured to provide the signal of the second reference signal end to the second node under control of the shift input signal end, and provide a signal of the first clock signal end to the second node under control of the first clock signal end;

a first end of the shift output sub-circuit is connected with the third node, a second end is connected with a second clock signal end, a third end is connected with the second node, a fourth end is connected with the second reference signal end, and a fifth end is connected with the shift output end; the shift output sub-circuit is configured to allow a voltage difference between the third node and the shift output end to be kept stable when the third node is in the floating state, provide a signal of the second clock signal end to the shift output end under control of the third node, and provide the signal of the second reference signal end to the shift output end under control of the second node;

a first end of the touch output sub-circuit is connected with the shift output end, a second end is connected with a touch input signal end, a third end is connected with the second node, a fourth end is connected with a common signal end, a fifth end is connected with the first clock signal end, and a sixth end is connected with a touch output end; and the touch output sub-circuit is configured to provide a signal of the touch input signal end to the touch output end under control of the shift output end, and provide a signal of the common signal end to the touch output end under control of at least one of the second node or the first clock signal end.

2. The touch scanning circuit according to claim 1, wherein the first control sub-circuit includes: a first switching transistor and a first capacitor, in which:
a gate electrode of the first switching transistor is connected with the first clock signal end, a source electrode is connected with the first node, and a drain electrode is connected with the third node; and
the first capacitor is connected between the first node and the shift output end.

3. The touch scanning circuit according to claim 2, wherein the second control sub-circuit includes: a ninth switching transistor and a tenth switching transistor, in which:
a gate electrode of the ninth switching transistor is connected with the shift input signal end, a source electrode is connected with the second reference signal end, and a drain electrode is connected with the second node; and
both a gate electrode and a source electrode of the tenth switching transistor are connected with the first clock signal end, and a drain electrode is connected with the second node.

4. The touch scanning circuit according to claim 2, wherein the second control sub-circuit includes: an eleventh switching transistor and a third capacitor, in which:
a gate electrode of the eleventh switching transistor is connected with the shift input signal end, a source electrode is connected with the second reference signal end, and a drain electrode is connected with the second node; and
the third capacitor is connected between the second node and the first clock signal end.

5. The touch scanning circuit according to claim 2, wherein the second control sub-circuit includes: a twelfth switching transistor, a thirteenth switching transistor, a fourteenth switching transistor and a fifteenth switching transistor, in which:
a gate electrode of the twelfth switching transistor is connected with the shift input signal end, a source electrode is connected with the second reference signal end, and a drain electrode is connected with a gate electrode of the fifteenth switching transistor;
a gate electrode of the thirteenth switching transistor is connected with the shift input signal end, a source electrode is connected with the second reference signal end, and a drain electrode is connected with the second node;
both a gate electrode and a source electrode of the fourteenth switching transistor are connected with the first clock signal end, and a drain electrode is connected with the gate electrode of the fifteenth switching transistor; and
a source electrode of the fifteenth switching transistor is connected with the first clock signal end, and a drain electrode is connected with the second node.

6. The touch scanning circuit according to claim 1, wherein the input sub-circuit includes: a second switching transistor and a third switching transistor, in which:
a gate electrode of the second switching transistor is connected with the shift input signal end, a source electrode is connected with the first reference signal end, and a drain electrode is connected with the first node; and
a gate electrode of the third switching transistor is connected with the second node, a source electrode is connected with the second reference signal end, and a drain electrode is connected with the first node.

7. The touch scanning circuit according to claim 6, wherein the second control sub-circuit includes: a ninth switching transistor and a tenth switching transistor, in which:
a gate electrode of the ninth switching transistor is connected with the shift input signal end, a source electrode is connected with the second reference signal end, and a drain electrode is connected with the second node; and
both a gate electrode and a source electrode of the tenth switching transistor are connected with the first clock signal end, and a drain electrode is connected with the second node.

8. The touch scanning circuit according to claim 6, wherein the second control sub-circuit includes: an eleventh switching transistor and a third capacitor, in which:
a gate electrode of the eleventh switching transistor is connected with the shift input signal end, a source electrode is connected with the second reference signal end, and a drain electrode is connected with the second node; and the third capacitor is connected between the second node and the first clock signal end.

9. The touch scanning circuit according to claim 6, wherein the second control sub-circuit includes: a twelfth switching transistor, a thirteenth switching transistor, a fourteenth switching transistor and a fifteenth switching transistor, in which:
- a gate electrode of the twelfth switching transistor is connected with the shift input signal end, a source electrode is connected with the second reference signal end, and a drain electrode is connected with a gate electrode of the fifteenth switching transistor;
- a gate electrode of the thirteenth switching transistor is connected with the shift input signal end, a source electrode is connected with the second reference signal end, and a drain electrode is connected with the second node;
- both a gate electrode and a source electrode of the fourteenth switching transistor are connected with the first clock signal end, and a drain electrode is connected with the gate electrode of the fifteenth switching transistor; and
- a source electrode of the fifteenth switching transistor is connected with the first clock signal end, and a drain electrode is connected with the second node.

10. The touch scanning circuit according to claim 1, wherein the shift output sub-circuit includes: a fourth switching transistor, a fifth switching transistor and a second capacitor, in which:
- a gate electrode of the fourth switching transistor is connected with the third node, a source electrode is connected with the second clock signal end, and a drain electrode is connected with the shift output end;
- a gate electrode of the fifth switching transistor is connected with the second node, a source electrode is connected with the second reference signal end, and a drain electrode is connected with the shift output end; and
- the second capacitor is connected between the third node and the shift output end.

11. The touch scanning circuit according to claim 10, wherein the second control sub-circuit includes: a ninth switching transistor and a tenth switching transistor, in which:
- a gate electrode of the ninth switching transistor is connected with the shift input signal end, a source electrode is connected with the second reference signal end, and a drain electrode is connected with the second node; and
- both a gate electrode and a source electrode of the tenth switching transistor are connected with the first clock signal end, and a drain electrode is connected with the second node.

12. The touch scanning circuit according to claim 1, wherein the touch output sub-circuit includes: a sixth switching transistor, a seventh switching transistor and an eighth switching transistor, in which:
- a gate electrode of the sixth switching transistor is connected with the shift output end, a source electrode is connected with the touch input signal end, and a drain electrode is connected with the touch output end;
- a gate electrode of the seventh switching transistor is connected with the second node, a source electrode is connected with the common signal end, and a drain electrode is connected with the touch output end; and
- a gate electrode of the eighth switching transistor is connected with the first clock signal end, a source electrode is connected with the common signal end, and a drain electrode is connected with the touch output end.

13. The touch scanning circuit according to claim 1, wherein the second control sub-circuit includes: a ninth switching transistor and a tenth switching transistor, in which:
- a gate electrode of the ninth switching transistor is connected with the shift input signal end, a source electrode is connected with the second reference signal end, and a drain electrode is connected with the second node; and
- both a gate electrode and a source electrode of the tenth switching transistor are connected with the first clock signal end, and a drain electrode is connected with the second node.

14. The touch scanning circuit according to to claim 1, wherein the second control sub-circuit includes: an eleventh switching transistor and a third capacitor, in which:
- a gate electrode of the eleventh switching transistor is connected with the shift input signal end, a source electrode is connected with the second reference signal end, and a drain electrode is connected with the second node; and
- the third capacitor is connected between the second node and the first clock signal end.

15. The touch scanning circuit according to claim 1, wherein the second control sub-circuit includes: a twelfth switching transistor, a thirteenth switching transistor, a fourteenth switching transistor and a fifteenth switching transistor, in which:
- a gate electrode of the twelfth switching transistor is connected with the shift input signal end, a source electrode is connected with the second reference signal end, and a drain electrode is connected with a gate electrode of the fifteenth switching transistor;
- a gate electrode of the thirteenth switching transistor is connected with the shift input signal end, a source electrode is connected with the second reference signal end, and a drain electrode is connected with the second node;
- both a gate electrode and a source electrode of the fourteenth switching transistor are connected with the first clock signal end, and a drain electrode is connected with the gate electrode of the fifteenth switching transistor; and
- a source electrode of the fifteenth switching transistor is connected with the first clock signal end, and a drain electrode is connected with the second node.

16. A touch driving circuit, comprising a plurality of touch scanning circuits in a cascade connection, each of the plurality of touch scanning circuits being the touch scanning circuit according to claim 1, wherein;
- except a final-stage touch scanning circuit, a shift output end in each of the remaining touch scanning circuits is respectively connected with a shift input signal end in a next-stage touch scanning circuit that is adjacent to the corresponding touch scanning circuit; and
- a shift input signal end in a first-stage touch scanning circuit is connected with a frame start signal end.

17. A touch panel, comprising a plurality of touch scanning lines disposed on an array substrate in the touch panel, and a touch driving circuit disposed at a border of the array substrate and configured to sequentially output touch scanning signals to the touch scanning lines, wherein the touch driving circuit is the touch driving circuit according to claim 9.

18. A driving method of the touch scanning circuit according to claim 1, comprising: an input period, an output period and a first maintaining period, in which:
- at the input period, the input sub-circuit provides the signal of the first reference signal end to the first node under the control of the shift input signal end; the second control sub-circuit provides the signal of the second reference signal end to the second node under the control of the shift input signal end; the first control sub-circuit allows the first node and the third node to be in the connecting state under the control of the first clock signal end; the shift output sub-circuit provides the signal of the second clock signal end to the shift output end under the control of the third node; the touch output sub-circuit provides the signal of the common signal end to the touch output end under the control of the first clock signal end;
- at the output period, the first node and the third node are in the floating state; the first control sub-circuit allows the voltage difference between the first node and the shift output end to be kept stable; the shift output sub-circuit allows the voltage difference between the third node and the shift output end to be kept stable, and provides the signal of the second clock signal end to the shift output end under the control of the third node; the touch output sub-circuit provides the signal of the touch input signal end to the touch output end under the control of the shift output end;
- at the first maintaining period, the second control sub-circuit provides the signal of the first clock signal end to the second node under the control of the first clock signal end; the input sub-circuit provides the signal of the second reference signal end to the first node under the control of the second node; the first control sub-circuit allows the first node and the third node to be in the connecting state under the control of the first clock signal end; the shift output sub-circuit provides the signal of the second reference signal end to the shift output end under the control of the second node; and the touch output sub-circuit provides the signal of the common signal end to the touch output end under the control of the second node and the first clock signal end.

19. The driving method according to claim 18, further comprising: a second maintaining period, in which:
- at the second maintaining period, the second control sub-circuit maintains a potential of the second node; the input sub-circuit provides the signal of the second reference signal end to the first node under the control of the second node; the first control sub-circuit allows the first node and the third node to be disconnected under the control of the first clock signal end; the shift output sub-circuit maintains a potential of the third node and provides the signal of the second reference signal end to the shift output end under the control of the second node; and the touch output sub-circuit provides the signal of the common signal end to the touch output end under the control of the second node.

20. The driving method according to claim 18, further comprising: a second maintaining period, in which:
- at the second maintaining period, the second control sub-circuit allows the second node and the second reference signal end to have a same potential; the first control sub-circuit allows the first node and the third node to be disconnected under the control of the first clock signal end; the shift output sub-circuit maintains a potential of the third node and maintains a potential of the shift output end; and the touch output sub-circuit provides no output signal to the touch output end.

* * * * *